United States Patent
Yang

(10) Patent No.: US 10,515,263 B2
(45) Date of Patent: *Dec. 24, 2019

(54) METHOD AND APPARATUS FOR SUBJECT IDENTIFICATION

(71) Applicant: Atheer, Inc., Mountain View, CA (US)

(72) Inventor: Allen Yang Yang, Richmond, CA (US)

(73) Assignee: Atheer, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,333

(22) Filed: May 12, 2017

(65) Prior Publication Data
US 2018/0365482 A1    Dec. 20, 2018

Related U.S. Application Data

(63) Continuation of application No. 15/402,083, filed on Jan. 9, 2017, now Pat. No. 9,684,820, which is a continuation of application No. 14/581,644, filed on Dec. 23, 2014, now Pat. No. 9,576,188.

(60) Provisional application No. 61/920,349, filed on Dec. 23, 2013.

(51) Int. Cl.
  *G06K 9/00* (2006.01)
  *G06K 9/62* (2006.01)
  *G06T 7/586* (2017.01)

(52) U.S. Cl.
  CPC ..... *G06K 9/00288* (2013.01); *G06K 9/00208* (2013.01); *G06K 9/00214* (2013.01); *G06K 9/00248* (2013.01); *G06K 9/00255* (2013.01); *G06K 9/6203* (2013.01); *G06K 9/6211* (2013.01); *G06K 9/6262* (2013.01); *G06T 7/586* (2017.01); *G06T 2207/10004* (2013.01); *G06T 2207/10152* (2013.01)

(58) Field of Classification Search
  None
  See application file for complete search history.

(56) References Cited

U.S. PATENT DOCUMENTS

7,095,878 B1 *  8/2006  Taylor  ................  G06K 9/00275
                                                      382/118
7,236,615 B2 *  6/2007  Miller  ................  G06K 9/00214
                                                      358/403

(Continued)

*Primary Examiner* — Iman K Kholdebarin
(74) *Attorney, Agent, or Firm* — Mohr Intellectual Property Law Solutions, PC

(57) ABSTRACT

Comprehensive 2D learning images are collected for learning subjects. Standardized 2D gallery images of many gallery subjects are collected, one per gallery subject. A 2D query image of a query subject is collected, of arbitrary viewing aspect, illumination, etc. 3D learning models, 3D gallery models, and a 3D query model are determined from the learning, gallery, and query images. A transform is determined for the selected learning model and each gallery model that yields or approximates the query image. The transform is at least partly 3D, such as 3D illumination transfer or 3D orientation alignment. The transform is applied to each gallery model so that the transformed gallery models more closely resemble the query model. 2D transformed gallery images are produced from the transformed gallery models, and are compared against the 2D query image to identify whether the query subject is also any of the gallery subjects.

21 Claims, 13 Drawing Sheets

(56) References Cited

U.S. PATENT DOCUMENTS

| | | | | |
|---|---|---|---|---|
| 7,940,285 B2* | 5/2011 | Would | | G06F 3/0482 345/629 |
| 9,104,908 B1* | 8/2015 | Rogers | | G06K 9/00315 |
| 9,165,404 B2* | 10/2015 | Han | | G09G 5/00 |
| 9,576,188 B2* | 2/2017 | Yang | | G06K 9/00288 |
| 9,684,820 B2* | 6/2017 | Yang | | G06K 9/00288 |
| 2002/0044152 A1* | 4/2002 | Abbott, III | | G06T 11/00 345/629 |
| 2005/0180626 A1* | 8/2005 | Moon | | G06K 9/00248 382/159 |
| 2007/0057911 A1* | 3/2007 | Fateh | | G06F 1/1626 345/156 |
| 2009/0153552 A1* | 6/2009 | Fidaleo | | G06Q 30/02 345/419 |
| 2009/0153554 A1* | 6/2009 | Lim | | G06T 13/40 345/419 |
| 2011/0064302 A1* | 3/2011 | Ma | | G06K 9/00275 382/159 |
| 2011/0141105 A1* | 6/2011 | Ting | | G06T 13/40 345/419 |
| 2012/0290879 A1* | 11/2012 | Shibuya | | G06N 20/00 714/26 |
| 2013/0063550 A1* | 3/2013 | Ritchey | | G16H 40/63 348/36 |
| 2013/0091081 A1* | 4/2013 | He | | G06N 20/00 706/12 |
| 2014/0037199 A1* | 2/2014 | Aharon | | H04N 19/97 382/159 |
| 2014/0063050 A1* | 3/2014 | Fateh | | G06T 11/206 345/619 |
| 2014/0099029 A1* | 4/2014 | Savvides | | G06K 9/481 382/197 |
| 2014/0279727 A1* | 9/2014 | Baraniuk | | G06N 20/00 706/11 |
| 2015/0220807 A1* | 8/2015 | Yang | | G06K 9/00288 382/159 |
| 2017/0071562 A1* | 3/2017 | Suzuki | | A61B 6/5205 |

* cited by examiner

METHOD AND APPARATUS FOR SUBJECT IDENTIFICATION

CLAIM OF PRIORITY

This application is a continuation application of U.S. patent application Ser. No. 15/402,083, entitled "METHOD AND APPARATUS FOR SUBJECT IDENTIFICATION," filed Jan. 9, 2017 which is a continuation application of U.S. patent application Ser. No. 14/581,644, entitled "METHOD AND APPARATUS FOR SUBJECT IDENTIFICATION," filed Dec. 23, 2014, which claims the benefit of U.S. Provisional Patent Application No. 61/920,349, entitled "METHOD AND APPARATUS FOR SUBJECT IDENTIFICATION," filed Dec. 23, 2013, all of which are expressly incorporated by reference herein.

FIELD OF THE INVENTION

The present invention relates to subject identification. More particularly, the present invention relates to the identification of subjects such as human faces in uncontrolled query images, by extracting a three-dimensional learning model from two-dimensional images and manipulating that three-dimensional models to account for imaging conditions of the query image.

DESCRIPTION OF RELATED ART

One possible approach for machine implemented subject recognition would utilize a gallery of images of various known or already-identified subjects, comparing a query image of an unknown subject against the gallery images.

However, image features may vary from one image to another. For example, considering a human face as the subject, the pose and/or orientation, level(s) and direction(s) of illumination, the direction from which the image is taken, the portion of the face that is within the frame, etc. may not necessarily be uniform among multiple images. Available gallery images may not represent a particular query image sufficiently so as to facilitate reliable identification of a face in the query image.

Modifying or "warping" a gallery image in order to approximate the image properties of a query image may not always be possible and/or useful. For example, a gallery image with a frontal view of a subject's face may not include sufficient information to identify a subject whose face appears in profile in a query image. In this example, a frontal view might not include the side of the head, a clear view of the ears, the back of the neck, etc. Absent sufficient information, a warp that is sufficient to turn a frontal image into a profile may yield substantial inaccuracies and/or alterations, which also may impact the reliability of identification.

BRIEF SUMMARY OF THE INVENTION

The present invention contemplates a variety of systems, apparatus, methods, and paradigms for subject identification.

In one embodiment of the present invention, a method is provided, the method including establishing at least one substantially three dimensional learning model of at least one learning subject, establishing at least one substantially three dimensional gallery model for at least one gallery subject, and establishing at least one substantially three dimensional query model of a query subject. The method includes determining a transform of at least one parent gallery model from among the gallery models in combination with at least one active learning model from among the learning models so as to yield at least one transformed gallery model, wherein the transformed gallery model approaches correspondence with at least one of the query models in at least one model property as compared with the parent gallery model. The method further includes applying the transform, and comparing at least one substantially two dimensional transformed gallery image at least substantially corresponding with the transformed gallery model against at least one substantially two dimensional query image at least substantially corresponding with the query model, so as to determine whether the query subject is gallery subject.

The learning images may include unique state of image properties as compared with the remainder of the learning images. Those image properties may include viewing aspect, illumination, texture, and/or configuration.

Each of the gallery images may include at least one substantially similar image property as compared with the remainder of the gallery images. That image property may include viewing aspect, illumination, texture, and/or configuration.

Each of the query images may include a unique state of image properties as compared with the gallery images. Those image properties may include viewing aspect, illumination, texture, and/or configuration.

The method may include determining the transformed gallery image from the transformed gallery model. The method may include determining the query image from the query model.

Establishing the learning model may include laser scanning, three dimensional tomography, time-of-flight measurement, depth imaging, ultrasonic mapping, holographic imaging, and/or plenoptic photography. Establishing the gallery model may include laser scanning, three dimensional tomography, time-of-flight measurement, depth imaging, ultrasonic mapping, holographic imaging, and/or plenoptic photography. Establishing the query model may include laser scanning, three dimensional tomography, time-of-flight measurement, depth imaging, ultrasonic mapping, holographic imaging, and/or plenoptic photography.

The method may include establishing at least one substantially two dimensional learning image of the at least one learning subject, and determining the learning model therefrom. Establishing the learning image may include digital photography, analog photography, two dimensional scanning, visible light imaging, near infrared imaging, thermal infrared imaging, ultraviolet imaging, monocrhome imaging, color imaging, multispectral imaging, hyperspectral imaging, millimeter wave imaging, transmissive x-ray imaging, and/or backscatter x-ray imaging.

The method may include establishing at least one substantially two dimensional gallery image of the at least one gallery subject, and determining the gallery model therefrom. Establishing the gallery image may include digital photography, analog photography, two dimensional scanning, visible light imaging, near infrared imaging, thermal infrared imaging, ultraviolet imaging, monocrhome imaging, color imaging, multispectral imaging, hyperspectral imaging, millimeter wave imaging, transmissive x-ray imaging, and/or backscatter x-ray imaging.

The method may include establishing at least one substantially two dimensional query image of the query subject, and determining the query model therefrom. Establishing the query image may include at least one of digital photography, analog photography, two dimensional scanning, visible light imaging, near infrared imaging, thermal infrared imaging, ultraviolet imaging, monocrhome imaging, color imaging, multispectral imaging, hyperspectral imaging, millimeter wave imaging, transmissive x-ray imaging, and/or backscatter x-ray imaging.

The learning subject may include a human face. The gallery subject may include a human face. The query subject may include a human face.

The learning subject may include a human, an animal, a plant, a landscape feature, a vehicle, a weapon, a food item, and/or a tool. The gallery subject may include a human, an animal, a plant, a landscape feature, a vehicle, a weapon, a food item, and/or a tool. The query subject may include a human, an animal, a plant, a landscape feature, a vehicle, a weapon, a food item, and/or a tool.

The method may include determining a pre-transform of at least one parent query model from among the query models in combination with at least one active learning model from among the learning models so as to yield at least one transformed query model, wherein the transformed query model approaches correspondence with at least one of the gallery models in at least one model property as compared with the parent query model. The method also may include determining the transform as being at least substantially an inverse of the pre-transform.

The transform may be at least partially a three dimensional transform. The transform may include a three dimensional illumination transfer. The transform may include a three dimensional aspect alignment. The transform may include a three dimensional reconfiguration. The at least one model property may include texture, shape, illumination, and/or configuration.

In another embodiment of the present invention, a method is provided, the method including establishing at least one substantially three dimensional learning model of at least one learning subject, establishing at least one substantially three dimensional gallery model for at least one gallery subject, and establishing at least one substantially three dimensional query model of a query subject. The method includes determining a transform of at least one parent query model from among query models in combination with at least one active learning model from among the learning models so as to yield at least one transformed query model, wherein the transformed query model approaches correspondence with at least one of the gallery models in at least one model property as compared with the parent query model. The method also includes applying the transform, and comparing at least one substantially two dimensional transformed query image at least substantially corresponding with the at least one transformed query model against at least one substantially two dimensional gallery image at least substantially corresponding with the at least one gallery model, so as to determine whether the query subject is the gallery subject.

In another embodiment of the present invention, a method is provided, the method including establishing at least one substantially three dimensional learning model of at least one learning subject, establishing at least one substantially three dimensional gallery model for at least one gallery subject, and establishing at least one substantially three dimensional query model of a query subject. The method includes determining a transform of at least one parent gallery model from among the gallery models in combination with at least one active learning model from among the learning models so as to yield at least one transformed gallery model, wherein the transformed gallery model approaches correspondence with at least one of the query models in at least one model property as compared with the parent gallery model. The method also includes applying the transform, and comparing the transformed gallery model against the query model, so as to determine whether the query subject is the gallery subject.

In another embodiment of the present invention, a method is provided, the method including establishing at least one substantially three dimensional learning model of at least one learning subject, establishing at least one substantially three dimensional gallery model for at least one gallery subject, and establishing at least one substantially three dimensional query model of a query subject. The method includes determining a transform of at least one parent query model from among the query models in combination with at least one active learning model from among the learning models so as to yield at least one transformed query model, wherein the transformed query model approaches correspondence with at least one of the gallery models in at least one model property as compared with the parent query model. The method also includes applying the transform, and comparing the transformed query model against the gallery model, so as to determine whether the query subject is the gallery subject.

In another embodiment of the present invention, a method is provided, the method including capturing a plurality of two dimensional digital learning images of a learning face, each of the learning images including a unique state of viewing aspect, illumination, texture, and configuration as compared with a remainder of the learning images, and determining computationally a three dimensional learning model from the learning images. The method includes capturing a plurality of two dimensional digital gallery images, one gallery image from each of a plurality of gallery faces, each of the gallery images including a state of at least substantially similar viewing aspect, illumination, and configuration as compared with a remainder of the gallery images, and determining computationally a plurality of three dimensional gallery models from the gallery images, one for each of the plurality of gallery faces. The method includes capturing a two-dimensional query image of a query face, the query image including a state of viewing aspect, illumination, and configuration at least substantially different from any of the gallery images, and determining computationally a three dimensional query model from the query image. The method also includes determining for each of the gallery models a pre-transform of the query model in combination with the learning model so as to yield a transformed query model, wherein each transformed query model approaches correspondence with regard to at least one of texture, shape, illumination, and configuration with a respective one of the gallery models, as compared with the query model, and determining for each of the gallery models a transform as being at least substantially an inverse of the respective pre-transform therefor. The method further includes applying the transforms to the respective gallery models so as to yield transformed gallery models, determining computationally a two dimensional transformed gallery image from each of the transformed gallery models, and comparing each of the transformed gallery images against the query image so as to determine whether the at least one query subject is any of the gallery subjects.

In another embodiment of the present invention, an apparatus is provided, the apparatus including a processor, and at least one of a sensor, a data store, and a communicator, in communication with the processor. The apparatus includes a learning image establisher including executable instructions instantiated on the processor, the learning image establisher being adapted to establish at least one two dimensional learning image of at least one learning subject via the sensor, the data store, and/or the communicator. The apparatus includes a learning model determiner including executable instructions instantiated on the processor, the learning model determiner being adapted to determine at least one three dimensional learning model from the learning images. The apparatus includes a gallery image establisher including executable instructions instantiated on the processor, the gallery image establisher being adapted to establish at least one two dimensional gallery image of at least one gallery subject via the sensor, the data store, and/or the communicator. The apparatus includes a gallery model determiner including executable instructions instantiated on the processor, the gallery model determiner being adapted to determine at least one three dimensional gallery model from the gallery images. The apparatus includes a query image establisher including executable instructions instantiated on the processor, the query image establisher being adapted to establish at least one two dimensional query image of at least one query subject via the sensor, the data store, and/or the communicator. The apparatus includes a query model determiner including executable instructions instantiated on the processor, the query model determiner being adapted to determine at least one three dimensional query model from the query images. The apparatus includes a learning model selector including executable instructions instantiated on the processor, the learning model selector being adapted to select at least one active learning model from the learning models. The apparatus includes a pre-transform determiner including executable instructions instantiated on the processor, the pre-transform determiner being adapted to determine a pre-transform of at least one parent query model from among the query models in combination with at least one active learning model from among the learning models so as to yield at least one transformed query model, wherein the transformed query model approaches correspondence with at least one of the gallery models in at least one model property as compared with the parent query model. The apparatus includes a transform determiner including executable instructions instantiated on the processor, the transform determiner being adapted to determine the transform as being at least substantially an inverse of the pre-transform. The apparatus includes a model transformer including executable instructions instantiated on the processor, the model transformer being adapted to transform the at least one gallery model to yield at least one transformed gallery model. The apparatus includes a transformed gallery image determiner including executable instructions instantiated on the processor, the transformed gallery image determiner being adapted to determine at least one two dimensional transformed gallery image from the transformed gallery models. The apparatus includes an image comparer including executable instructions instantiated on the processor, the image comparer being adapted to compare the transformed gallery images against the query images so as to determine whether the query subject is the gallery subject.

In another embodiment of the present invention, an apparatus is provided, the apparatus including a processor, a sensor in communication with the processor, the sensor being adapted to sense two dimensional images, and at least one of a data store and a communicator, also in communication with the processor. The apparatus includes a learning model establisher including executable instructions instantiated on the processor, the learning model establisher being adapted to establish at least one three dimensional learning model of at least one learning subject via the data store and/or communicator. The apparatus includes a gallery model establisher including executable instructions instantiated on the processor, the gallery model establisher being adapted to establish at least one three dimensional gallery image of at least one gallery subject via the data store and/or the communicator. The apparatus includes a query image establisher including executable instructions instantiated on the processor, the query image establisher being adapted to establish at least one two dimensional query image of at least one query subject via the sensor. The apparatus includes a query model determiner including executable instructions instantiated on the processor, the query model determiner being adapted to determine at least one three dimensional query model from the query images. The apparatus includes a learning model selector including executable instructions instantiated on the processor, the learning model selector being adapted to select at least one active learning model from among the learning models. The apparatus includes a pre-transform determiner including executable instructions instantiated on the processor, the pre-transform determiner being adapted to determine a pre-transform of at least one parent query model from among the query models in combination with at least one active learning model from among the learning models so as to yield at least one transformed query model, wherein the transformed query model approaches correspondence with at least one of the gallery models in at least one model property as compared with the parent query model. The apparatus includes a transform determiner including executable instructions instantiated on the processor, the transform determiner being adapted to determine the transform as being at least substantially an inverse of the pre-transform. The apparatus includes a model transformer including executable instructions instantiated on the processor, the model transformer being adapted to transform the gallery models to yield at least one transformed gallery model. The apparatus includes a transformed gallery image determiner including executable instructions instantiated on the processor, the transformed gallery image determiner being adapted to determine at least one two dimensional transformed gallery image from the transformed gallery models. The apparatus includes an image comparer including executable instructions instantiated on the processor, the image comparer being adapted to compare the transformed gallery images against the query images so as to determine whether the query subject is the gallery subject.

In another embodiment of the present invention, a head mounted display is provided, the head mounted display including a processor, a sensor in communication with the processor, the sensor being adapted to sense two dimensional images, and a data store and/or a communicator in communication with the processor. The head mounted display includes a learning model establisher including executable instructions instantiated on the processor, the learning model establisher being adapted to establish a three dimensional learning model of a learning subject via the data store and/or the communicator. The head mounted display includes a gallery model establisher including executable instructions instantiated on the processor, the gallery model establisher being adapted to establish a three dimensional gallery image of each of a plurality of gallery subjects via the data store and/or the communicator. The head mounted display includes a query image establisher including executable instructions instantiated on the processor, the query image establisher being adapted to establish a two dimensional query image of a query subject via the sensor. The head mounted display includes a query model determiner including executable instructions instantiated on the processor, the query model determiner being adapted to determine a three dimensional query model from the query image. The head mounted display includes a pre-transform determiner including executable instructions instantiated on the processor, the pre-transform determiner being adapted to determine a pre-transform of the query model in combination with the learning model so as to yield at least one transformed query model approaching correspondence with the gallery models in at least one of texture, shape, illumination, and configuration as compared with the parent query model. The head mounted display includes a transform determiner including executable instructions instantiated on the processor, the transform determiner being adapted to determine at least one transform as at least substantially an inverse of the pre-transforms. The head mounted display includes a model transformer including executable instructions instantiated on the processor, the model transformer being adapted to transform the gallery models to yield a plurality of transformed gallery models. The head mounted display includes a transformed gallery image determiner including executable instructions instantiated on the processor, the transformed gallery image determiner being adapted to determine two dimensional transformed gallery images from the transformed gallery models. The head mounted display includes an image comparer including executable instructions instantiated on the processor, the image comparer being adapted to compare the transformed gallery images against the query image so as to determine whether query subject is any of the gallery subjects. The head mounted display includes an outputter in communication with the processor, the outputter being adapted to output visual content regarding a comparison result as to whether the query subject is any of the gallery subjects. The processor, the sensor, the at least one of the data store and the communicator, and the outputter are disposed on a frame, the frame being configured so as to be wearable on the head of a wearer, wherein when the frame is worn the outputter is disposed proximate, facing, and substantially aligned with at least one eye of the wearer, and the sensor is disposed so as to at least substantially match a line of sight of at least one eye of the wearer.

In another embodiment of the present invention, an apparatus is provided, the apparatus including means for establishing at least one substantially three dimensional learning model of at least one learning subject, means for establishing at least one substantially three dimensional gallery model for at least one gallery subject, and means for establishing at least one substantially three dimensional query model of a query subject. The apparatus includes means for determining a transform of at least one parent gallery model from among the gallery models in combination with at least one active learning model from among the learning models so as to yield at least one transformed gallery model, wherein the transformed gallery model approaches correspondence with at least one of the query models in at least one model property as compared with the parent gallery model. The apparatus also includes means for applying the transform, and means for comparing at least one substantially two dimensional transformed gallery image at least substantially corresponding with the transformed gallery model against at least one substantially two dimensional query image at least substantially corresponding with the query model, so as to determine whether the query subject is the gallery subject.

BRIEF DESCRIPTION OF THE SEVERAL VIEWS OF THE DRAWINGS

Like reference numbers generally indicate corresponding elements in the figures.

DETAILED DESCRIPTION OF THE INVENTION

Figure 1:
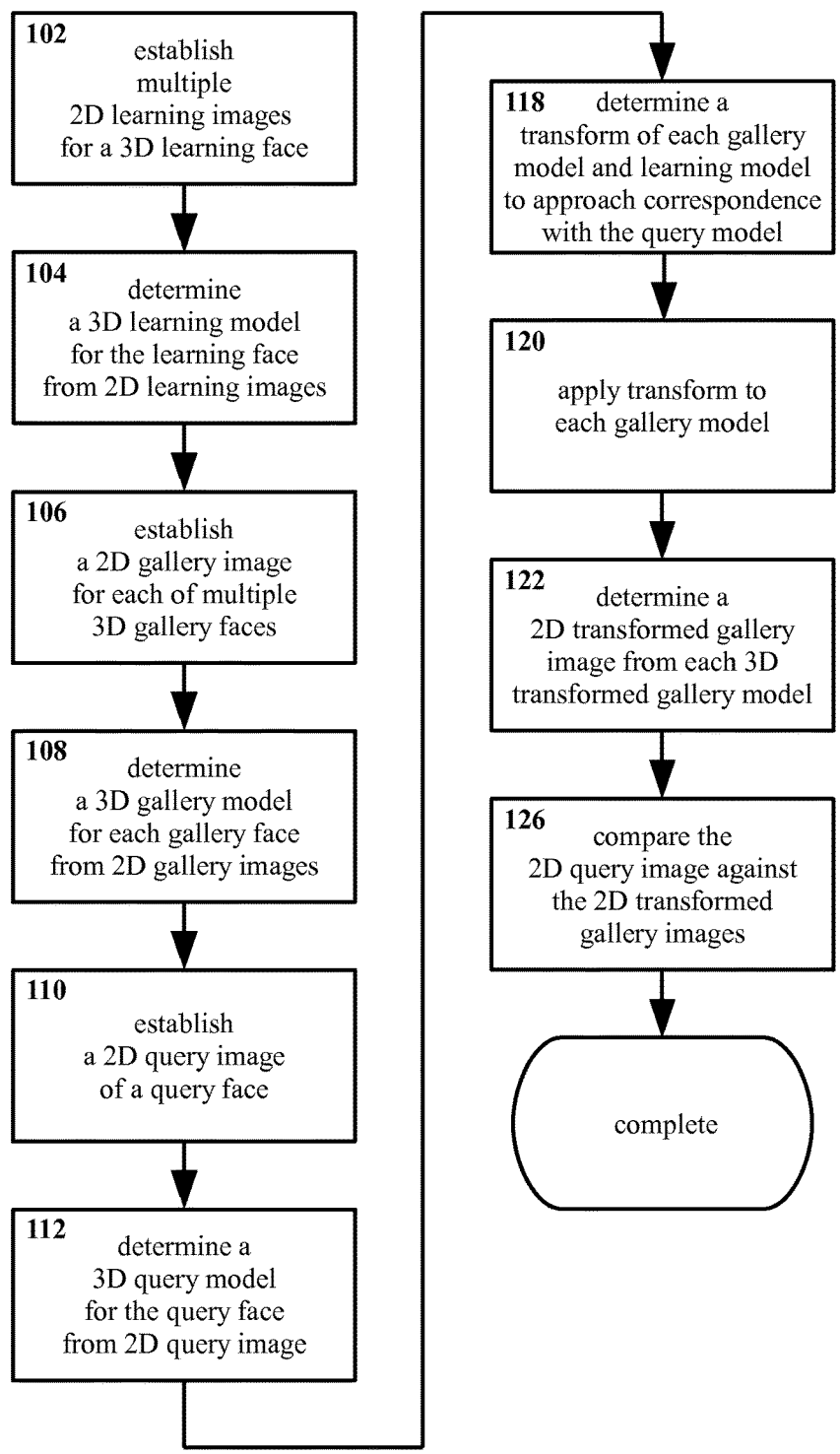
FIG. 1 illustrates an example embodiment of a method for identifying faces in images according to the present invention, in flow chart form.

With reference to FIG. 1, an example method according to the present invention is described herein. More particularly, FIG. 1 shows in flow chart form an example embodiment of a method for identifying human faces in images according to the present invention.

For clarity, the example method in FIG. 1 addresses a single, concrete class of subjects, namely human faces. However, the present invention is not limited only to consideration of human faces. For example, for certain embodiments consideration of other subjects such as automobiles, firearms, dogs, etc. may be equally suitable. It is also emphasized that the present invention is not limited only to one type of subject, e.g. a single embodiment might address both human faces and automobiles.

Furthermore, for simplicity the example method in FIG. 1 is described to at least some degree in qualitative terms. More detailed and/or concrete description is presented subsequently herein with regard to other examples and/or figures. However, it is emphasized that the present invention is not particularly limited with regard to how the invention may be implemented in terms of mathematics. Although for at least certain embodiments, incorporation of concepts and/or mathematics relating to sparse representation and/or three dimensional morphable models ("3DMM") may be useful, this is an example only, and other arrangements may be equally suitable.

Typically, though not necessarily, a method such as that described with regard to FIG. 1 may be carried out using a processor, for example a digital electronic processor with executable instructions instantiated thereon. However, this is an example only, and other arrangements may be equally suitable.

In the example arrangement of FIG. 1, multiple two-dimensional learning images are established 102 depicting a single three-dimensional learning face. Learning images depict, describe, define, etc. the subject class—human faces—in general. Learning images may be considered to serve as a baseline for a class or type of subjects. For the example in FIG. 1, color digital JPG or PNG format photographs may be taken of a real and living person who is serving as learning subject during a photography session. As a more particular example, color digital images might be taken of the learning face from many aspects (e.g. front, profile, top, etc.), while the face exhibits different postures (e.g. smiling, frowning, speaking, etc.), and/or under different lighting conditions (e.g. top, front, bottom, tightly focused, diffuse, incandescent, fluorescent, etc.), so as to provide extensive data characterizing the learning subject. However, the present invention is not particularly limited with regard to either the form or properties of the learning images and/or how images are established, and other arrangements may be equally suitable.

With regard to establishing images in the present invention, whether learning images or otherwise, the term "establish" should be understood considered broadly. It is noted that to "establish" something may, depending on particulars, refer to either or both the creation of something new (e.g. establishing a business, wherein a new business is created) and the determination of a condition that already exists (e.g. establishing the whereabouts of a person, wherein the location of a person who is already present at that location is discovered, received from another source, etc.). Similarly, establishing an image may encompass several potential approaches, including but not limited to the following.

Establishing an image may include capturing images from a physical entity (e.g. photographing a human face), rendering images from a data model, or otherwise producing the image from some parent entity.

Establishing an image also may include creating the image "from scratch" without regard to a parent entity, e.g. a processor may execute instructions so as to create an image in some fashion, whether from existing data, user inputs, internal algorithms, etc.

Establishing an image additionally may include acquiring a previously-existing image, for example by reading an image file from a data store, downloading an image through a communication link, or otherwise obtaining an image that already exists substantially in a form as to be used by some embodiment of the present invention.

The present invention is not particularly limited insofar as how images may be established. It is required only that an image that is functional in terms of the present invention is in some fashion made manifest. Other arrangements than those described may be equally suitable. Also, where used with regard to other steps such as establishing a model, etc., the term "establish" should be similarly be interpreted in a broad fashion.

It is emphasized that in the example of FIG. 1, multiple images are established 102 of a single face. Typically though not necessarily, learning images are established 102 so as to represent the learning face with multiple aspects (i.e. as seen from different directions), under multiple lighting conditions, in multiple poses and/or facial expressions, etc. For the example of FIG. 1, the learning images serve to characterize a single learning face to a sufficient degree as to provide a baseline for future consideration of other faces. In more colloquial terms, the learning images facilitate learning "what a face looks like", in at least broad terms. For example, features such as a general shape of a human head, the existence, shape, position, etc. of eyes, nose, mouth, and so forth, ranges of motion of jaw, lips, eyelids, etc. may be documented and made available through suitable learning images.

As previously noted, the steps in FIG. 1 may be carried out in a processor. A processor may not "know" that certain data represent (for example) head shape, eye position, etc. The description of "learning" as applied to learning images, learning faces, etc. is descriptive, and the present invention is not limited to colloquial understandings thereof.

Continuing in FIG. 1, a three dimensional learning model is determined 104 from the two dimensional learning images established in step 102. Typically though not necessarily, the three dimensional learning model may be determined 104 computationally, through spatial analysis of features within the two dimensional learning images, though other arrangements may be equally suitable.

The present invention is not particularly limited with regard to what information may be incorporated into the learning model. Typically though not necessarily, a learning model may include information regarding one or more of shape, texture, and illumination of a face.

Shape may be considered as representing the volume, surface, direction of normality, etc. of the face. In some sense the shape, and thus likewise in some sense the learning model as a whole, might be envisioned as a three dimensional "sculpture" of the original learning face, as based on the multiple two dimensional learning images established for that learning face. For at least certain embodiments, this may be at least approximately correct.

However, human faces are not necessarily static with regard to shape. For a particular human face hair may move, the jaw may open and close, muscles may contract and relax, the lips may change shape, eyes may open and shut, etc. Similarly, on longer timescales the shape of a face may change due to changing hairstyle, injury, aging, etc. Furthermore, elements that may not necessarily be considered part of the face in a very strict sense nevertheless may be significant when considering the face as a shape, such as glasses, hats, jewelry, etc., other "worn" or temporary features, etc.

Thus, although it may be convenient to refer to "the" shape of a face as being a fixed form, in practice a face may not have a single shape. Likewise, although it may be convenient to refer to shape as a single time-fixed quantity (and for simplicity such reference is made at places herein), a learning model may not necessarily have a fixed shape. Rather, the learning model may be considered to be variable, "morphable", etc. Thus a given learning model may not necessarily represent a face only in a single configuration, and/or at a single moment in time, but may include a range of possible expressions, hairstyles, etc.

With regard to texture in a learning model, the term "texture" may refer to actual texture, e.g. roughness or smoothness of a surface. However, "texture" may refer in addition and/or instead to other surface properties, such as coloring, translucency, reflectivity, etc. It is noted that terms such as "texture", "texture map", etc. are terms of art with regard to surfaces of three dimensional computer graphical models, and/or other models.

As noted with regard to shape, texture in a human face is not necessarily static. Color, reflectivity, etc. may change with exertion, emotion, tanning, aging, etc. Also, color notably may be deliberately altered e.g. through application of makeup, use of hair dye, and so forth; other texture properties likewise may be deliberately altered. Texture information in a learning model also may not necessarily be restricted only to a single state or moment in time.

With regard to illumination in a learning model, illumination may refer to features such as direction, intensity, spread, color, etc. of a light source or light sources illuminating a face (and similarly shadowing. For example, a face lit from directly underneath the chin may appear visually quite different from a face lit from above, even if no other factors change (e.g. the shape, viewing aspect, texture, etc.). While lighting, shadowing, etc. may not necessarily be considered part of a face in a strict sense, lighting, and/or response to lighting nevertheless may be incorporated into a learning model for a face according to the present invention.

As noted with regard to shape and texture, lighting of a human face is not necessarily static. Motion of a face, motion of light sources, changes in the brightness, color, spread, etc. of lighting, changes in conditions affecting light (e.g. fog, dust, smoke, etc. may impact lighting as incident on the face, regardless of whether those conditions affect obstruct or otherwise directly affect viewing of the face), etc. may manifest. Lighting in a learning model also may not necessarily be restricted only to a single state or moment in time.

Comments made with regard to content and variability of the learning model, and to shape, texture, lighting, and/or other information therein, should be understood as applying similarly to other models, such as gallery and query models described subsequently herein. However, this should not be taken to imply that all learning, gallery, and/or query models must include shape, texture, and/or lighting information, that all learning, gallery, and/or query models must be variable, and/or that learning models, gallery models, and/or query models must or will include identical or similar data to one another. These are examples only, and other arrangements may be equally suitable.

Moving on in FIG. 1, a two dimensional gallery image is established 106 for each of multiple three dimensional gallery faces. Gallery faces are faces of various individuals, typically though not necessarily the individuals against which unknown faces are to be compared. Gallery images thus may be considered to serve as example images, against which an unknown query image (described subsequently herein) may be matched, e.g. so as to determine whether a face in a gallery image is the same as an unknown query face in a query image.

For the example in FIG. 1, gallery images may be color digital JPG or PNG format photographs taken of real persons who are serving as gallery subjects. However, the present invention is not particularly limited with regard to either the form or properties of the gallery images and/or how the gallery images are established, and other arrangements may be equally suitable.

Typically though not necessarily, gallery images may be to at least some degree standardized. Gallery images may be established so as to have similar size, resolution, face posture, lighting properties, focus, aspect (e.g. full-front, left profile, etc.) Such an arrangement may be understood as being perhaps similar to standardized database photographs such as driver's license or passport photographs, wherein faces of individuals are imaged under controlled lighting, from a full-front aspect, with a neutral facial expression, etc. However, the present invention is not particularly limited with regard to the specifics of the gallery images, and non-uniform gallery images and/or other arrangements may be equally suitable.

Also typically though not necessarily, gallery faces may be associated with additional information. For example, the names, ages, addresses, etc. of the relevant persons may be known. In such an example, the names and/or other information relating to the gallery faces also may be associated with the gallery images, either when the gallery images are established 106 or subsequently. To continue the example, the name of each individual might be attached to a digital file that makes up or includes the digital image (likewise the individual's age, address, etc.). Other information, including but not limited to information regarding when, where, under what conditions, etc. the gallery images are established 106 similarly may be associated with the gallery faces and/or the gallery images. For example, for gallery images obtained as JPG or PNG format digital image files, the camera make and model, date, time, GPS location, focus, etc. may be so associated, as may be information regarding lighting conditions, the operator of the camera (if any), and so forth. For arrangements wherein such information is associated with some or all of the gallery images, those gallery images and/or the gallery faces depicted therein may in some sense be considered to be "known" images and/or faces.

However, the present invention is not particularly limited with regard to what information, if any, may be associated with the gallery faces and/or gallery images, and other information or no information at all may be equally suitable. For example, it is permissible for a gallery image and/or the associated gallery face to be unknown; thus, a gallery image of an unknown gallery face might be compared according to the present invention with a query image of a query face that also is unknown. While such comparison may not result in identifying the query face, other functions may be accomplished, for example determining whether a person of unknown identity depicted in two different images (one treated as a gallery image and one as a query image) is the same person.

It is also noted that the learning face may or may not also be one of the gallery faces. While including the learning face as a gallery face (and thus obtaining both learning images and a gallery image of the same face) is not required, neither is such prohibited.

In addition, it is noted that different learning images, gallery images, etc. may represent a single subject (e.g. a single human face) at different times, and/or otherwise in different states. For example, first and second gallery images and gallery models might depict the same face from the same aspect, with the same illumination, etc. but wherein the first gallery image depicts the face at age 20 and the second gallery image depicts the face at age 50. Such an arrangement may for example facilitate determination of whether a particular query image represents that face at or near a given time. Different gallery images of the same face also might represent the subject while wet or dry, with different hairstyles, etc. Although certain of such states may be represented within the learning images and/or the learning model, this does not exclude representation of such states within the gallery images and/or gallery models in addition or instead.

Still with reference to FIG. 1, a three dimensional gallery model is determined 108 for each gallery face from the corresponding two dimensional gallery image for that gallery face, the gallery images having been established in step 106. Typically though not necessarily, the three dimensional gallery models may be determined 108 computationally, through spatial analysis of features within the two dimensional gallery images, though other arrangements may be equally suitable.

As noted with regard to the learning model, it may be convenient to imagine the gallery models as three dimensional "sculptures" of the original gallery faces, as based on the single two dimensional gallery images obtained for each gallery face. However, as again noted with regard to the learning model, such a convenient description is not necessarily correct for all embodiments of the present invention, and gallery models may not necessarily be static or limited to a single configuration and/or moment in time. Other arrangements may be equally suitable.

Typically, though not necessarily, gallery models may include data regarding shape, texture, and/or illumination.

Typically, though not necessarily, the gallery models may be determined 108 so as to incorporate less accuracy, fidelity, total data, etc. than the learning model. For example, a three dimensional gallery model determined 108 using data from only one two-dimensional gallery image may include less information than a three dimensional learning model determined using data from many two-dimensional learning images. Thus, for at least certain embodiments the gallery models may exhibit lower resolution, less overall fidelity, less precision, etc. However, this is an example only, and other arrangements may be equally suitable.

Optionally, some or all gallery models may be determined 108 with reference to and/or including information from the learning model. For example, consider a learning model that may be a relatively comprehensive representation of a learning face, by virtue of being based on many two dimensional learning images of the learning face (as opposed to gallery models that may for example utilize data from only one gallery image). Such a comprehensive learning model may be utilized to inform the determination of gallery models from single corresponding gallery images. That is, if the learning model may be considered to represent in at least a general sense "what a human face looks like" in terms of shape, motion, etc., then that general sense of the shape, motion, etc. of a human face may be utilized when determining the gallery models. As a concrete example, even if a single gallery image is full-frontal, without information regarding the shape of features not visible therein such as the back of the head, a gallery model based on such a gallery image may refer to the learning model in determining that the back of the head is (or at least to a high probability may be) generally convex in shape, etc. Thus, even though gallery models may be determined 108 from only a single gallery image each, the determination 108 of gallery models may nevertheless take advantage of information from the learning model to provide more accuracy, precision, fidelity, etc. than may be expected from a model generated only from a single two dimensional image. In more colloquial terms, when modeling a human face from a single photo, it may be informative to know generally what a human face looks like from other photographs.

However, referring to and/or including information from the learning model in determining 108 the gallery models is not required, and other arrangements may be equally suitable. In addition, for at least certain embodiments the gallery models may not be, and/or may not be required to be, complete models. For example, a gallery model based on a single left-profile image of a gallery face may not include information regarding the right side of the face, and such information may not be required.

Still with reference to FIG. 1, to briefly summarize results from steps 102 through 108, many two dimensional learning images have been acquired with comprehensive information for a single learning face, and a detailed three dimensional learning model has been generated from that comprehensive information, such that the learning model may be suitable as a baseline standard for a human face. Further, individual two dimensional gallery images for each of many gallery faces have been acquired with at least basic information regarding those many gallery faces, and three dimensional gallery models have generated from that basic information, such that the gallery models may serve as possible comparisons for unknown faces.

Continuing in FIG. 1, a two dimensional query image is established 110 for a three dimensional query face. A query face is the face of a person, typically though not necessarily a person of unknown identity; a query image thus represents data that is to be compared with gallery images, e.g. so as to determine whether the query face is the same as one of the gallery faces.

For the example in FIG. 1, a query image may be a color digital JPG or PNG format photographs taken of some real person. However, the present invention is not particularly limited with regard to either the form or properties of the query image and/or how the query image is established, and other arrangements may be equally suitable.

Typically though not necessarily, learning images and gallery images may be clear, complete (i.e. showing the full face), well-lit, of high resolution, etc. By contrast, query images may frequently be images that are "whatever is available": the query face may be partially obscured or only partially in the field of view, the focus may be poor, the resolution may be low, there may be motion blur, poor lighting, etc. While the present invention does not exclude query images that are of good quality, in practice query images frequently may not be of good quality.

Typically, though not necessarily, the query face and one of the gallery faces may be the same face, i.e. the same person. However, this is not required; if a comparison of a query face against a group of gallery faces yields no match, this in itself may be useful information, e.g. an indication that whoever the query subject may be, that query subject is not one of a number of known gallery subjects.

Moving on in FIG. 1, a three dimensional query image is determined 112 for the query face from the query image. Typically though not necessarily, the three dimensional query model may be determined 112 computationally, through spatial analysis of features within the two dimensional query image, though other arrangements may be equally suitable.

As noted with regard to the learning and gallery models, it may be convenient to imagine the query model as a three dimensional "sculpture" of the original query face, as based on the single two dimensional query image obtained for the query face. However, as again noted with regard to the learning and gallery models, such a convenient description is not necessarily correct for all embodiments of the present invention, and query models may not necessarily be static or limited to a single configuration and/or moment in time. Other arrangements may be equally suitable.

Typically, though not necessarily, a query model may include data regarding shape, texture, and/or illumination.

Also typically though not necessarily, and as already noted with regard to the gallery models, the query model may be determined 112 so as to incorporate less accuracy, fidelity, total data, etc. than the learning model. However, other arrangements may be equally suitable.

Also as with the gallery models, optionally the query model may be determined 112 with reference to and/or including information from the learning model. Thus even though the query model may be determined 112 from only a single query image, the determination 112 of the query model may nevertheless take advantage of information from the learning model to provide more accuracy, precision, fidelity, etc. than may be expected from a model generated only from a single two dimensional image.

However, referring to and/or including information from the learning model in determining 112 the query model is not required, and other arrangements may be equally suitable. In addition, for at least certain embodiments the query models may not be, and/or may not be required to be, complete models. For example, a query model based on a single left-profile image of a gallery face may not include information regarding the right side of the face, and such information may not be required.

Still with reference to FIG. 1, a transform is determined 118 for combinations of each gallery model with the learning model, wherein the result approaches correspondence with the query model.

For example, consider an arrangement wherein in the query image, the query face is lit from a light source above and to the left of the query face, and the query face is also turned to the right and downward relative to the camera (or some other image source), and the query face exhibits a posture as if speaking. As may be understood, such particulars may affect the appearance of the query face in the query image, and likewise may affect the query model which was determined from the query image.

Consider further that for this particular example, in the gallery images the gallery faces are lit from directly in front, are facing directly into the camera (or other image source), and are in a neutral, non-speaking posture. Again, such particulars may affect the appearance of the gallery faces in the gallery images, and likewise the gallery models determined from the gallery images.

Given such an arrangement, the query image may correspond poorly with the gallery images at least in terms of lighting and viewing aspect, and the query model likewise may correspond poorly with the gallery models. In more colloquial terms, for purposes of comparison than query image has "the wrong lighting", and is viewed from "the wrong angle". Although this particular example may be considered arbitrary, in general it may commonly happen that the query and gallery images and models do not necessarily reflect corresponding arrangements with regard to how the faces are oriented, lit, postured, etc.

It is noted that this issue—the likelihood that query images may not be relied upon to reliably correspond with available gallery images—may pose a significant problem in machine-implemented subject recognition. The ability to address this issue with a high degree of reliability and success is also an advantage of the present invention (though not necessarily the only such advantage). The present invention enables executing subject recognition even when the image that is to be recognized bears little apparent resemblance to the known image used for comparison, i.e., the query model corresponds poorly with the gallery models.

Thus as noted, a transform is determined 118 for each gallery model in combination with the learning model such that the result does at least substantially correspond with the query model.

Typically though not necessarily, the transform determined 118 in FIG. 1 is a mathematical transform, with the learning, gallery, and query models or at least certain properties thereof expressed in mathematical form. Approaching correspondence thus may be considered with regard to mathematical similarity, for at least certain embodiments of the present invention. In qualitative terms, typically (though not necessarily) approaching correspondence may address features such as viewing aspect, illumination, facial configuration (e.g. jaw and mouth posture, changes in hair growth and style, etc.), texture (e.g. coloring, reflectivity, etc.). Colloquially, the term "approaching correspondence" with regard to the present invention is used herein to indicate an increased similarity in such features, i.e. the viewing aspects are made more similar, etc.

However, it is emphasized that embodiments of the present invention may not require perfect or even near-perfect correspondence, nor is a particular degree of absolute correspondence necessarily required. Rather, correspondence should be approached, i.e. the degree of similarity should improve. For example, if the query model and a particular gallery model exhibit different viewing aspects, the transform may result in those viewing aspects being more closely aligned.

For certain embodiments, a high degree of correspondence or even a near-perfect or perfect mathematical match between the query image and the result of the transform as applied to a gallery model and the learning model may be suitable. For other embodiments, less rigorous similarity may be acceptable. The degree of correspondence and/or of improvement in correspondence may for example depend upon factors such as the available data, including but not limited to the data available in the query image. For example, given a very poor quality query image, with limited and/or uncertain data therein, a very close correspondence may be impossible, impractical, or problematic. Regardless, the present invention is not particularly limited with regard to a degree of correspondence or a degree of improvement of correspondence.

In colloquial terms, the transform serves to adjust the gallery models to more closely resemble the query model, so that the gallery faces as presented therein resemble the query face as presented in the query image. That is, the gallery faces are made to "look like" the query face, so as to facilitate comparison thereof (described subsequently herein, for example with regard to step 126).

Continuing in FIG. 1, the transform as determined in step 118 is applied 120 to each gallery model, so that the gallery models approach correspondence with the query model. Typically, though not necessarily, this may result in changes in lighting, shape, etc. of the gallery faces as represented in the gallery models. Thus, following step 120 the transformed gallery models more closely correspond with the query model.

Two dimensional transformed gallery images are determined 122 from the three dimensional transformed gallery models. Typically though not necessarily, the two dimensional transformed gallery images may be determined 122 computationally, through spatial analysis of features within the three dimensional transformed gallery models, though other arrangements may be equally suitable. This may be (but is not required to be) in some sense a reversal of method step 108, wherein three dimensional gallery models were determined from two dimensional gallery images. Where step 108 addresses determination of three dimensional models from two dimensional images, step 122 addresses determination of two dimensional images from three dimensional models. In colloquial terms, steps 108 through 122 may be considered to "up convert" 2D gallery images and a 2D query image into 3D gallery models and a 3D query model, to transform the 3D gallery models to correspond with the 3D query model, and then to "down convert" the transformed 3D gallery models back into 2D transformed gallery images.

It is noted that in the arrangement shown in FIG. 1, no step is shown wherein the three dimensional query model is used to determine a two dimensional image. Because the query model is not transformed, a two dimensional image determined from the query model would at least approximate the original query image, so a conversion from 2D to 3D and back to 2D may not be necessary or useful, at least for certain embodiments of the present invention. While determining a new two dimensional query image is not prohibited, neither is such step necessarily required.

Continuing in FIG. 1, the two dimensional query image is compared 126 against the two dimensional transformed gallery images, e.g. to determine whether the query face in the query image is the same as any of the gallery faces in any of the gallery images.

Following step 126, the method shown in FIG. 1 is complete. However, the present invention is not limited only to the steps shown in the example arrangement of FIG. 1. Other steps and/or repetitions of steps already shown may be equally suitable. Likewise, subdividing steps shown may be suitable for at least certain embodiments, and incorporating a method according to the present invention into a larger method, or breaking a method according to the present invention into smaller sub-sections, also may be equally suitable.

At this point it may be useful to illustrate graphically certain features of the present invention, including some as may already have been referred to with regard to FIG. 1.

Figure 2A:
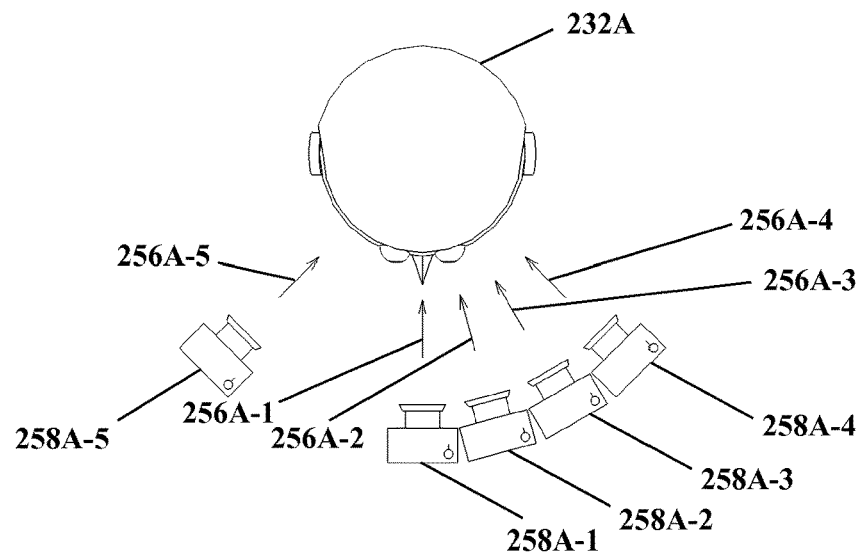
FIG. 2A and FIG. 2B show example arrangements of imagers and viewing aspects relative to a learning face.

Now with reference to FIG. 2A, as noted previously a learning model according to the present invention may be determined from multiple viewing aspects, under multiple lighting conditions, with multiple facial postures, etc. By way of illustration, in FIG. 2A a learning face 232A is shown in top-down view, with several imagers 258A-1 through 258A-5 shown therein, arranged so as to capture images of the learning face 232A along several viewing aspects 256A-1 through 256A-5. Imager 258A-1 (shown in FIG. 2A as a camera, such as a digital point-and-shoot camera, though this is an example only and other arrangements may be equally suitable) is disposed approximately full-front (as viewed top down, with full-front at the bottom of edge of FIG. 2A); imager 258A-2 is disposed approximately 15 degrees right of full-front; imager 258A-3 is disposed approximately 30 degrees right of full-front; imager 258A-4 is disposed approximately 45 degrees right of full-front; and imager 258A-5 is disposed approximately 45 degrees left of full front. Viewing aspects 256A-1 through 256A-5 are likewise arranged facing inward from approximately full-front, 15 degrees right, 30 degrees right, 45 degrees right, and 45 degrees left of full-front, respectively. These are example aspects and imagers only, presented for illustrative purposes, and other arrangements may be equally suitable.

It is noted that the learning face 232A is shown in FIG. 2A as a subject of an example embodiment of the present invention, not necessarily as an element thereof, and that other faces and/or subjects shown and described herein may not necessarily be part of the respective example embodiments of the present invention shown and described.

Figure 2B:
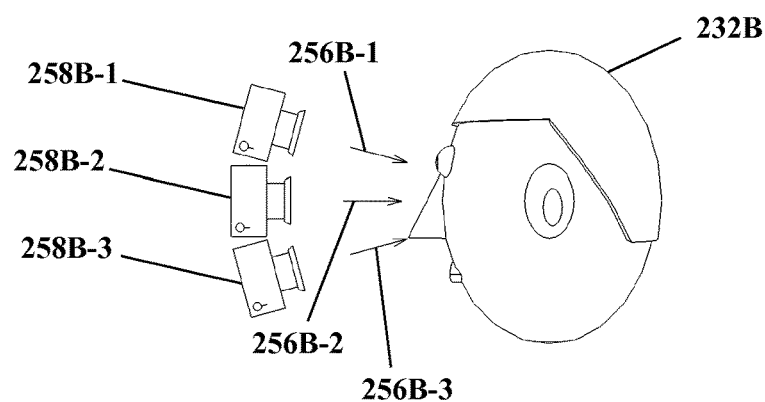

With reference to FIG. 2B, a learning face 232B is shown in left profile view, with several imagers 258B-1 through 258B-3 shown therein, arranged so as to capture images of the learning face 232B along several viewing aspects 256B-1 through 256B-3. Imager 258B-1 is disposed approximately 15 degrees above horizontal; imager 258B-2 is disposed approximately at horizontal; and imager 258B-3 is disposed approximately 15 degrees below horizontal. Viewing aspects 256B-1 through 256B-3 are likewise arranged facing inward from approximately 15 degrees above, 0 degrees, and 15 degrees below horizontal, respectively. These also are example aspects and imagers only, presented for illustrative purposes, and other arrangements may be equally suitable.

Now with reference to FIG. 3A through FIG. 3E, therein are shown several example views of a learning face, e.g. as might correspond with viewing aspects as shown in FIG. 2A and FIG. 2B. As noted, typically a learning face may be imaged from multiple viewing aspects; the present invention is not particularly limited with regard to specific viewing aspects, and those shown in FIG. FIG. 3A through FIG. 3E (and likewise FIG. 2A and FIG. 2B) are examples only.

Figure 3A:
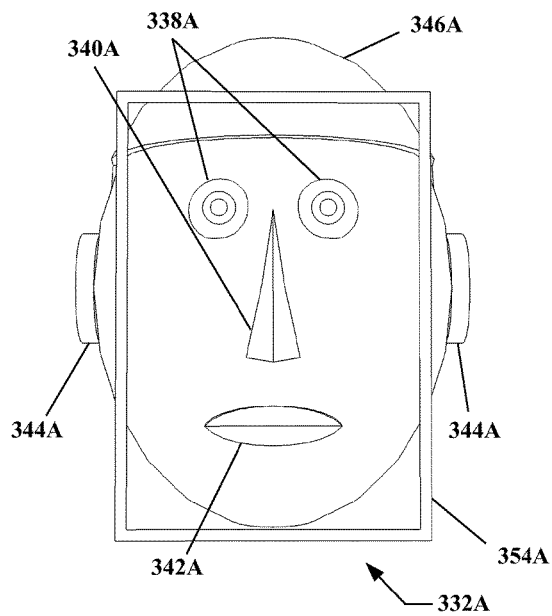
FIG. 3A through FIG. 3F show example views of a learning face from different viewing aspects according to the present invention.

In FIG. 3A, a learning face 332A is visible therein, with eyes 338A, nose 340A, mouth 342A, ears 344A, and hair 346A thereof also visible. (The learning face 332A is presented in a somewhat simplified and abstracted form rather than being fully realistic, for purposes of clarity.) As may be seen, the learning face 332A is oriented approximately full-frontal with no inclination from the horizontal, with respect to the point of view of FIG. 3A; alternately, it may be considered that the viewing aspect is approximately in the horizontal and angled at 0 degrees relative to the learning face 332A.

In addition, a framing box 354A is shown in FIG. 3A. The framing box 354A is an artifact, which may not be present for a real face. However, as may be understood from comparison with FIG. 3B through FIG. 3E, the framing box 354A in FIG. A may illustrate a feature relevant to two dimensional images depicting three dimensional subjects, namely apparent distortion related to viewing aspect.

With regard to viewing aspect, it is noted that the view of the learning face 332A in FIG. 3A may correspond at least approximately to viewing aspect 256A-1 in FIG. 2A, and to viewing aspect 256B-2 in FIG. 2B.

Figure 3B:
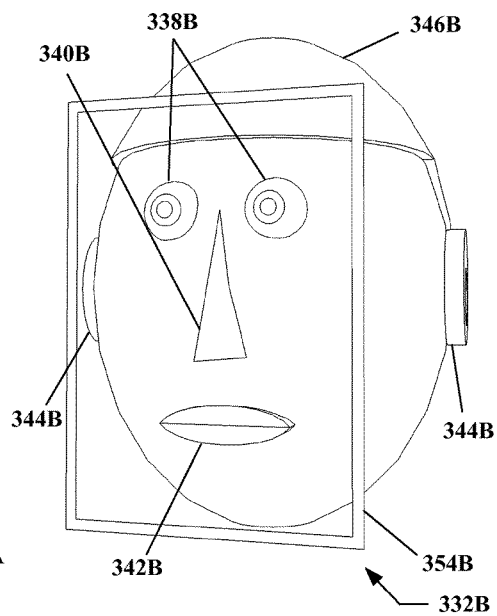

With regard to FIG. 3B, a learning face 332B is also visible therein, with eyes 338B, nose 340B, mouth 342B, ears 344B, and hair 346B thereof also visible, and a framing box 354B. The learning face 332B is oriented approximately 15 degrees left with no inclination from horizontal, or alternately the viewing aspect is oriented 15 degrees right with no inclination. As may be seen the framing box 354B is distorted compared to the framing box 354A in FIG. 3A; although the framing box is in at least approximately the same position and orientation relative to the respective learning faces, the framing box 354B in FIG. 3B appears offset to the left and appears smaller on the left edge thereof as compared with the framing box 354A in FIG. 3A. With regard to viewing aspect, the view of the learning face 332B in FIG. 3B may correspond at least approximately to viewing aspect 256A-2 in FIG. 2A, and to viewing aspect 256B-2 in FIG. 2B.

Figure 3C:
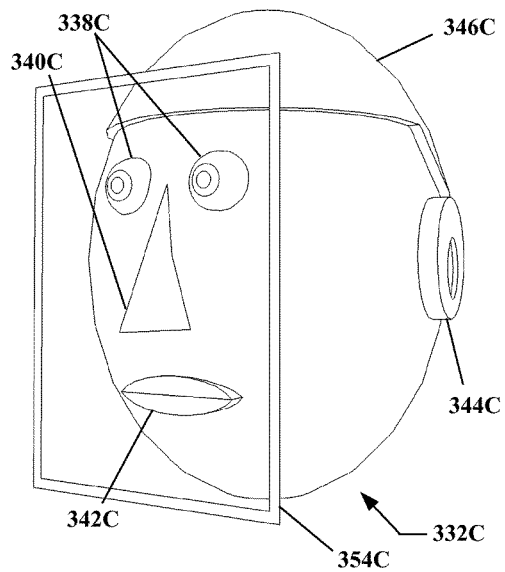

With reference to FIG. 3C, a learning face 332C is visible with eyes 338C, nose 340C, mouth 342C, and hair 346C and a framing box 354C. However, only one ear 344C is visible. The learning face 332C is oriented approximately 30 degrees left with no inclination from horizontal, or alternately the viewing aspect is oriented 30 degrees right with no inclination. The framing box 354C is again distorted compared to the framing boxes 354A and 354B in FIG. 3A and FIG. 3B. The view of the learning face 332C in FIG. 3C may correspond at least approximately to viewing aspect 256A-3 in FIG. 2A, and to viewing aspect 256B-2 in FIG. 2B.

Figure 3D:
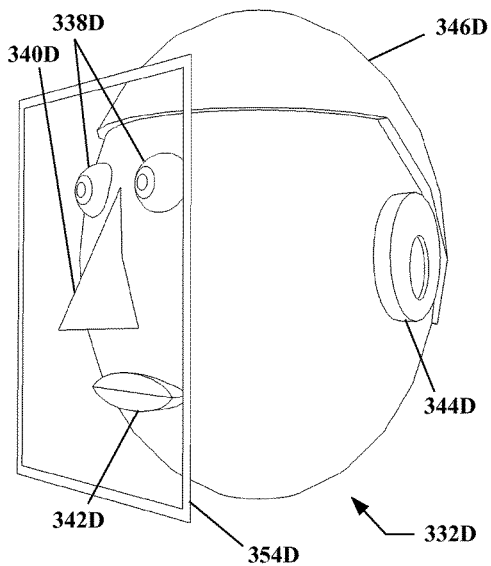

Now referring to FIG. 3D, a learning face 332D is visible with eyes 338D, nose 340D, mouth 342D, one ear 344D, hair 346D, and a framing box 354D. The learning face 332D is oriented approximately 45 degrees left with no inclination from horizontal, or alternately the viewing aspect is oriented 45 degrees right with no inclination. The framing box 354D is again distorted compared to framing boxes 354A through 354C in FIG. 3A through FIG. 3C. The view of the learning face 332D in FIG. 3D may correspond at least approximately to viewing aspect 256A-4 in FIG. 2A, and to viewing aspect 256B-2 in FIG. 2B.

Figure 3E:
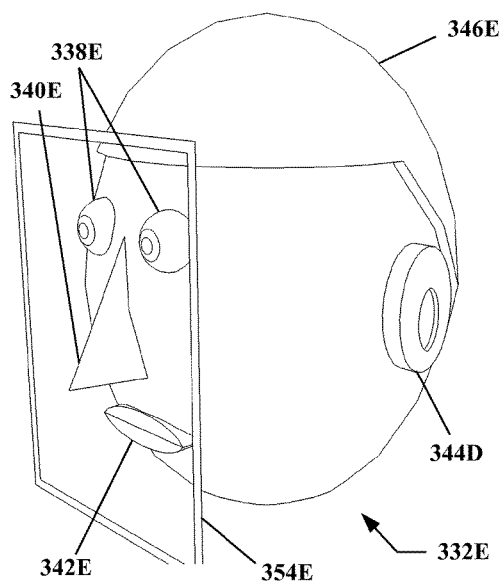

In FIG. 3E, a learning face 332E is visible with eyes 338E, nose 340E, mouth 342E, one ear 344E, hair 346E, and a framing box 354E. The learning face 332E is oriented approximately 45 degrees left and 15 degrees below horizontal, or alternately the viewing aspect is oriented 45 degrees right and 15 degrees above horizontal relative to the learning face 332E. The framing box 354E is again distorted compared to framing boxes 354A through 354D in FIG. 3A through FIG. 3D. In addition, attention is called to the apparent relative positions of the eyes 338E: one eye (the left of the learning face 332E, on the right side of FIG. 3E as shown) appears to be below the other eye. By contrast, in FIG. 3A the eyes 338A therein appear to be at similar heights to one another.

The view of the learning face 332E in FIG. 3E may correspond at least approximately to viewing aspect 256A-4 in FIG. 2A, and to viewing aspect 256B-1 in FIG. 2B.

Figure 3F:
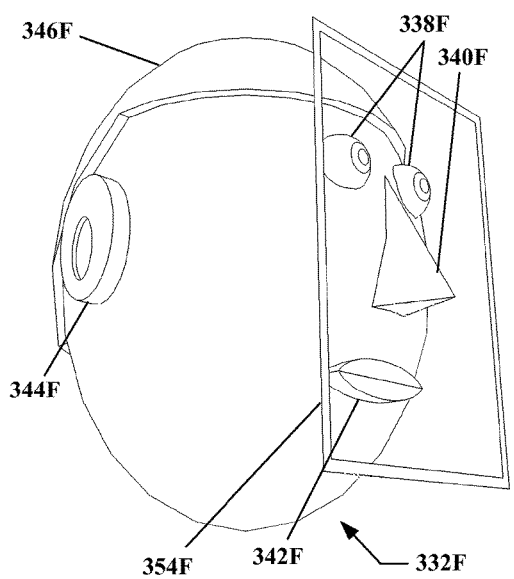

Now with regard to FIG. 3F, a learning face 332F is visible with eyes 338F, nose 340F, mouth 342F, one ear 344F (though the opposite ear from that visible in FIG. 3E), hair 346F, and a framing box 354F. The learning face 332F is oriented approximately 45 degrees right and 15 degrees above horizontal, or alternately the viewing aspect is oriented 45 degrees left and 15 degrees below horizontal relative to the learning face 332F. The framing box 354F is again distorted compared to framing boxes 354A through 354E in FIG. 3A through FIG. 3E. In addition, attention is again called to the apparent relative positions of the eyes 338F: one eye again appears to be below the other eye (the right of the learning face 332F, on the left side of FIG. 3F as shown). By contrast, in FIG. 3A the eyes 338A therein appear to be at similar heights to one another, while in FIG. 3E the relative heights of the eyes 338E appear reversed.

The view of the learning face 332E in FIG. 3E may correspond at least approximately to viewing aspect 256A-4 in FIG. 2A, and to viewing aspect 256B-1 in FIG. 2B.

Although FIG. 3A through FIG. 3F are of learning faces, certain features that may not necessarily be exclusive to learning faces and/or learning images according to the present invention may be observed through comparison of FIG. 3A through FIG. 3E.

As may be seen from FIG. 3A through FIG. 3E, whether a particular feature of a three dimensional subject (in the case of FIG. 3A through FIG. 3E, a human face) is visible in a given two dimensional image thereof may be at least in part a function of the viewing aspect (or alternately, the orientation of the subject). For example, in FIG. 3A two ears 344A are visible, while in FIG. 3C only one ear 344C is visible. While presumably the learning face 332C in FIG. 3C also may have a second ear, that second ear is not visible therein.

As also may be seen from FIG. 3A through FIG. 3E, in particular with regard to the framing boxes 354A through 354E therein, even for features of a three dimensional subject (in the case of FIG. 3A through FIG. 3E, a human face) that are visible in two images taken from different aspects, at least some degree of distortion may be present when viewing a two dimensional image thereof. Notably, the framing boxes 354A through 354E are of visibly different shape in FIG. 3A through FIG. 3E. While the framing boxes are, as noted, comparison artifacts that may not necessarily be present for a real learning face, nevertheless the distortion thereof may be illustrative of distortion that may be present when considering a two dimensional image of a three dimensional subject.

This variability in visible features and in apparent perspective may be understood in that a two dimensional image of a three dimensional object may in at least some sense be considered a "projection" of that three dimensional object into two dimensions. Thus, the relative orientation of the three dimensional subject with regard to the viewing aspect of a two dimensional image thereof may affect both what may be visible and the apparent shape, size, position, etc. of what is visible.

This variability in appearance of two dimensional images of three dimensional subjects may be of significance in matching such subjects. This variability is described further subsequently herein.

As noted, the arrangements in FIG. 2A and FIG. 2B and in FIG. 3A through FIG. 3F are examples. Although only a few viewing aspects and images therefor are shown in FIG. 2A and FIG. 2B and in FIG. 3A through FIG. 3F, more comprehensive image arrangements also may be suitable. With regard now to FIG. 4A and FIG. 4B, other example arrangements shown, as may be considered more comprehensive in terms of viewing aspect.

Figure 4A:
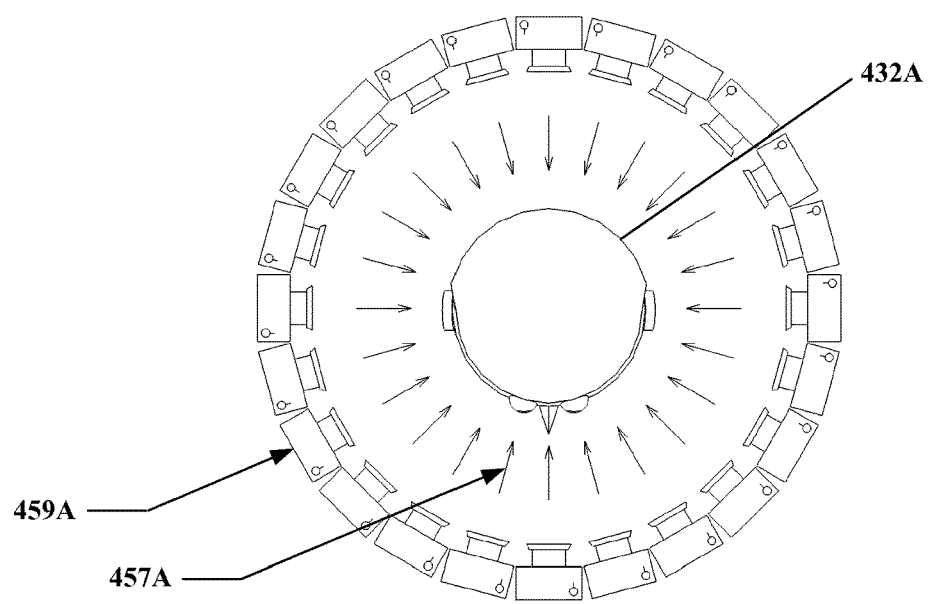
FIG. 4A and FIG. 4B show example arrangements of imagers and viewing aspects relative to a learning face.

In FIG. 4A, a learning face 432A is shown in a top-down view. An array 459A of imagers is shown; while for simplicity the imagers in the imager array 459A are not individually identified as in FIG. 2A and FIG. 2B, it may be understood that as shown the imager array 459A includes multiple imagers at least somewhat similar to those shown and described with regard to FIG. 2A and FIG. 2B. In the example of FIG. 4A, twenty-four imagers are shown in the array 459A, surrounding the learning face 432A at intervals of approximately 15 degrees. Similarly, an array 457A of viewing aspects also is shown, corresponding with the points of view of the imagers in the imager array 459A.

Figure 4B:
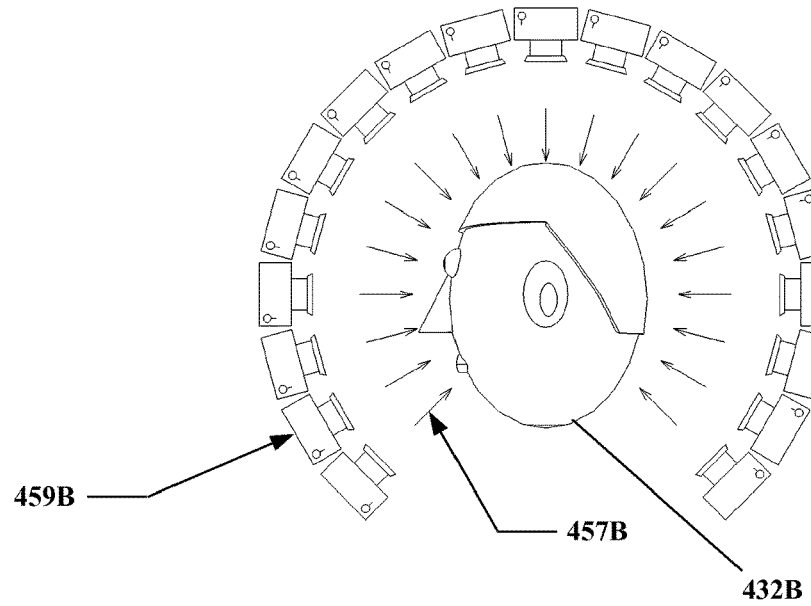

In FIG. 4B a learning face 432B is shown in a left profile view. Another array 459B of imagers is shown, the array 459B as shown including nineteen such imagers disposed around the learning face 432B at intervals of approximately 15 degrees. A gap is left in the array 459B as shown to accommodate the body of a subject providing the learning face 432B (the body not being shown in FIG. 4B), though this is an example only and other arrangements may be equally suitable. In addition, an array 457B of viewing aspects is shown corresponding with the points of view of the imagers in the imager array 459A.

More, fewer, and different. Point out that substantially anything that generates a 2D "image" is an option.

The arrangements of imagers and/or viewing aspects as shown in FIG. 4A and FIG. 4B are examples only, and the present invention is not particularly limited with regard to how learning images may be established for a learning face, and/or along what viewing aspects such learning images may be established.

Arrangements having more imagers and/or viewing aspects, fewer imagers and/or viewing aspects, and/or different configurations of imagers and/or viewing aspects may be equally suitable.

Furthermore, although FIG. 4A and FIG. 4B show a one-to-one correspondence between imagers and viewing aspects, other arrangements also may be suitable. For example, a single imager, and/or several imagers, may be configured so as to establish learning images from several viewing aspects each. As a more concrete example, a single imager might be disposed movably, capturing images from many different viewing aspects in succession as the imager is moved with respect to the learning face. Conversely, a single imager might be disposed in a stationary configuration, with the learning face being moved with respect to the imager. Some combination of motion of imager(s) and/or learning face also may be suitable.

Although the imagers shown in FIG. 4A and FIG. 4B are depicted for illustrative purposes as hand-held cameras, such as a digital point-and-shoot camera, this is an example only. For embodiments wherein imaging hardware is utilized, the present invention is not particularly limited with regard to the specifics of such hardware. Substantially any system adapted to establish a two dimensional image may be suitable. (In addition, directly establishing three dimensional models, without necessarily first establishing two dimensional images, also may be equally suitable, as is described subsequently herein.)

Similarly, the present invention is not particularly limited as to what form a two dimensional learning image may take. While color digital images may be suitable for certain embodiments, film based and/or monochrome images also may be suitable. Images in wavelengths other than visible light, including but not limited to near infrared, thermal infrared, millimeter wave, back scatter x-ray, and ultraviolet may be equally suitable. Images not based on light, such as an ultrasound image, also may be suitable. Substantially any two dimensional image may be suitable for use with at least certain embodiments of the present invention, and the present invention is not particularly limited with regard thereto.

Furthermore, although FIG. 4A and FIG. 4B and certain other figures and descriptions herein refer to human faces as subjects, these are examples only. The present invention is not limited only to human faces as learning, gallery, and/or query subjects, and other subjects, whether living or otherwise, may be equally suitable.

In addition, although the arrangements in FIG. 4A and FIG. 4B do not address sources of illumination, facial posture, and/or facial texture, it may be understood that as described, it may be understood from the examples shown in FIG. 4A and FIG. 4B with regard to viewing aspect that learning images may include information regarding such feature (and/or other features), and that such features also may be varied. For example, as imagers may be arranged along various viewing aspects as shown in FIG. 4A and FIG. 4B, light sources likewise might be arranged along various aspects relative to the learning face. Light sources also may vary in color, brightness, focus, etc.

The comments made with regard to learning images and the establishing thereof may also apply similarly to gallery images and/or query images, except where otherwise noted herein.

With regard to distinguishing learning, gallery, and query images and models, and illustrating model transform and transformed gallery images, FIG. 5A through FIG. 5D are now referenced.

Figure 5A:
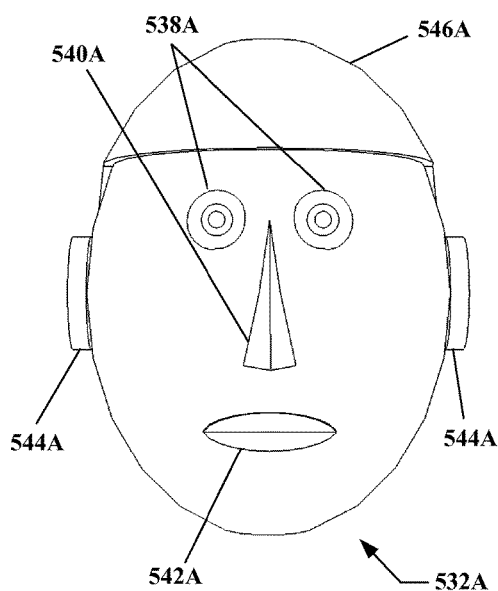
FIG. 5A, FIG. 5B, FIG. 5C, and FIG. 5D show example views of a learning face, a gallery face, a query face, and a transformed query face, respectively, according to the present invention.

In FIG. 5A, an example learning face 532A is shown. Given the limits of two dimensional illustration, FIG. 5A also might be considered to represent element 532A as depicting (in two dimensions) a three dimensional learning model, and/or as depicting a two dimensional learning image. Regardless, as may be seen, in FIG. 5A eyes 538A, mouth 542A, ears 544A, and hair 546A are visible therein.

Typically, though not necessarily, a learning image corresponding to a full frontal view as in FIG. 5A may be available; as noted, many learning images may be established, and a full frontal view may be one of such learning images. Alternately, a learning model may be sufficiently detailed that regardless of whether a full frontal image is available, a full frontal view nevertheless may be obtained by appropriately orienting the learning model.

Figure 5B:
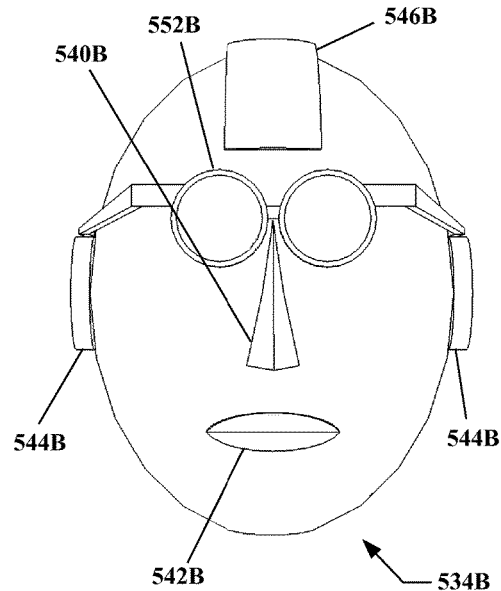

In FIG. 5B, an example gallery face 534B is shown. Again, FIG. 5B also might be considered to represent element 534B as depicting a three dimensional gallery model, and/or as depicting a two dimensional gallery image. As may be seen, in FIG. 5B mouth 542B, ears 544B, and hair 546B are visible therein. However, the hair 546B in FIG. 5B is visibly different in form (hairstyle) than the hair 546A in FIG. 5A. In addition, eyes are not directly visible in FIG. 5B, being obscured by glasses 552B. As may be understood, for example in considering the hair 546B and glasses 552B in FIG. 5B, the gallery face may be significantly different from the learning face in FIG. 5A.

Typically, though not necessarily, a gallery image corresponding to a full frontal view as in FIG. 5B may be available; at least certain existing groupings and/or databases of images, such as driver's license photographs, passport images, mug shots, etc. may include full frontal views. Regardless of what precise image(s) and/or viewing aspect(s) are available in a gallery, typically (though not necessarily) gallery images may exhibit at least somewhat uniform appearance, e.g. most or all gallery images have a similar viewing aspect, similar lighting, a similar facial posture, etc. Thus, some sort of "standard view" may be expected for gallery images for at least certain embodiments of the present invention (though not necessarily the example view shown in FIG. 5B).

Figure 5C:
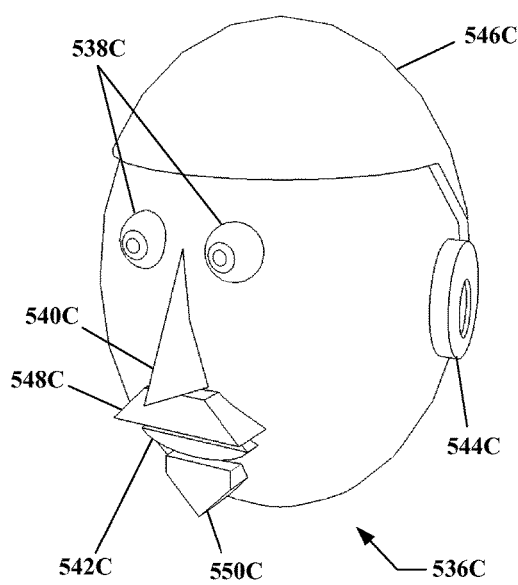

Now with reference to FIG. 5C, an example query face 536C is shown. Again, FIG. 5B also might be considered to represent element 536C as depicting a three dimensional query gallery model, and/or as depicting a two dimensional query image. As may be seen, in FIG. 5C eyes 538C, mouth 542C, an ear 544C, and hair 546C are visible therein. However, in FIG. 5C a mustache 548C and a beard 550C are visible as well. As may be understood, the query face may be significantly different from the learning face in FIG. 5A, and/or may be significantly different from some, perhaps most, of the gallery faces. (Though at least one gallery face may be the same face as the query face, assuming a match is present in the gallery.)

As may be seen, the viewing aspect in FIG. 5C is not a full frontal view. Rather, the query face 536C is turned to the right and downward with respect to the point of view. Typically, though not necessarily, query images may be "as found". For example, if attempting to identify an individual from an image taken by a security camera, it may not always be the case that the individual in question will be imaged in a full-frontal view, under good lighting, etc. Thus, query images may be anticipated to exhibit substantially arbitrary viewing aspects, lighting, facial postures, etc. Also, persons in query images may either deliberately or incidentally vary in their appearance as compared to gallery images of those same persons. For example, hairstyles change, facial hair is grown or shaved, scars may be acquired, makeup may be worn, jewelry, glasses, clothing, etc. may cover part or all of the face, subjects may have aged since a gallery image was obtained, etc. Thus, the matter of facial recognition may problematic on multiple levels.

However, according to the present invention the effectiveness of facial identification (and of object identification more generally) may be improved through modifying the appearance of gallery faces so as to more closely approach correspondence with a query face. In adjusting, for example, the viewing aspect of the gallery faces, the lighting of the gallery faces, etc. so as to be more similar to the viewing aspect and lighting of the query face, comparison and identification may be made more reliable and/or more robust.

As noted previously with regard to step 118 in FIG. 1, in at least certain embodiments of the present invention this may be accomplished by determining a transform of a three dimensional gallery model to approach correspondence with a three dimensional query model.

At least in principle, it may be possible to carry out such a transform in two dimensions, that is, by transforming two dimensional gallery images to resemble to a dimensional query image. However, this may be problematic in itself, since the two dimensional images in question are themselves representative of three dimensional faces. A two dimensional projection of a three dimensional subject exhibits a relationship that may be described as "dense", in that many different potential three dimensional constructs might yield or at least approximate a given two dimensional projection. In effect, a transform must be made from one of a wide range of possible faces to correspond with one of another wide range of possible faces.

By contrast, a three dimensional model exhibits a relationship with a three dimensional subject that may be described as "sparse", in that there is at least approximately a one-to-one correspondence between model and subject. Thus, a transform is made from one possible face to correspond to another one possible face.

In practice, factors such as imperfect data and computational limitations may restrict determination of absolute one-to-one transforms. Nevertheless, transforms in three dimensions according to the present invention may enable high accuracy and/or reliability of matching, and/or other advantageous features.

Figure 5D:
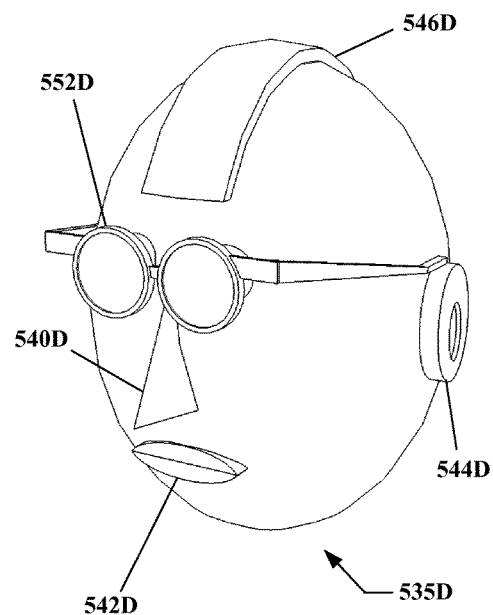

Now with reference to FIG. 5D, therein is shown a transformed gallery face 535D. Yet again, FIG. 5B also might be considered to represent element 536C as depicting a three dimensional query gallery model, and/or as depicting a two dimensional query image. As may be seen, in FIG. 5D mouth 542D, an ears 544D, hair 546D, and glasses 552D are visible therein.

The arrangement in FIG. 5D represents a gallery face (e.g. similar to gallery face 534B in FIG. 5B), subsequent to a transform according to the present invention, such that the transformed gallery face 535D more closely corresponds with the query face 536C in FIG. 5C in terms of viewing aspect. (In practice, other features besides viewing aspect may be considering instead or in addition, including but not limited to lighting, facial posture, etc.) That is, through visual inspection the transformed gallery face 535D may be viewed as "the same face" as the gallery face 534B in FIG. 5B. However, again through visual inspection the viewing aspect of the transformed gallery face 535D now corresponds more closely with the viewing aspect of the query face 536C in FIG. 5C.

Consequently, a comparison of the query face 536C in FIG. 5C and the transformed gallery face 535D in FIG. 5D may be a more "apples to apples" comparison than would be a comparison of the query face 536C against the gallery face 534B.

However, in FIG. 5C a mustache 548C and a beard 550C are visible as well. As may be understood, the query face may be significantly different from the learning face in FIG. 5A, and/or may be significantly different from some, perhaps most, of the gallery faces. (Though at least one gallery face may be the same face as the query face, assuming a match is present in the gallery.)

Turning now to FIG. 6A through FIG. 6D, therein another example illustrating a transform according to the present invention is shown. Where FIG. 5A through FIG. 5D illustrated a transform with regard to viewing aspect alone, FIG. 6A through FIG. 6D illustrate a transform with regard to illumination, viewing aspect, and facial pose.

Figure 6A:
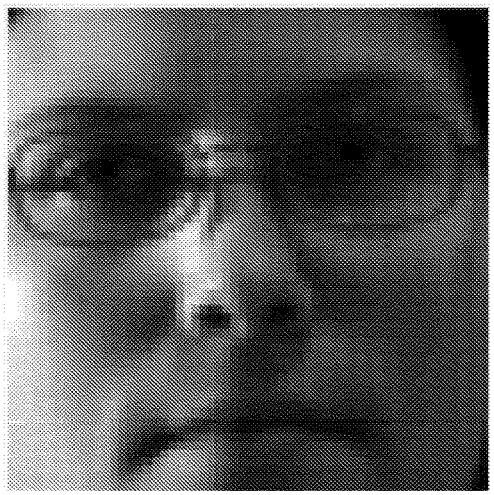
FIG. 6A, FIG. 6B, FIG. 6C, and FIG. 6D show example photographs representing a query image, a gallery image, a transform, and a transformed gallery image, respectively, according to the present invention.

In FIG. 6A, a query image is shown, that query image exhibiting essentially arbitrary pose (e.g. viewing aspect, orientation to an imager, etc.) and lighting (e.g. number of light sources, direction, brightness, etc.) for a query face. In the example shown, lighting is mainly to the right side of the subject's face, and the face is tilted slightly to the subject's right.

Figure 6B:

In FIG. 6B, a gallery image is shown, exhibiting a vertical, full frontal view of a gallery face. Such view and illumination may be exhibited in at least certain galleries, as noted previously, and may be taken to represent "good" or at least "standardized" viewing conditions and/or image properties.

Notably, FIG. 6A and FIG. 6B exhibit different lighting, orientation, and facial posture.

Figure 6C:
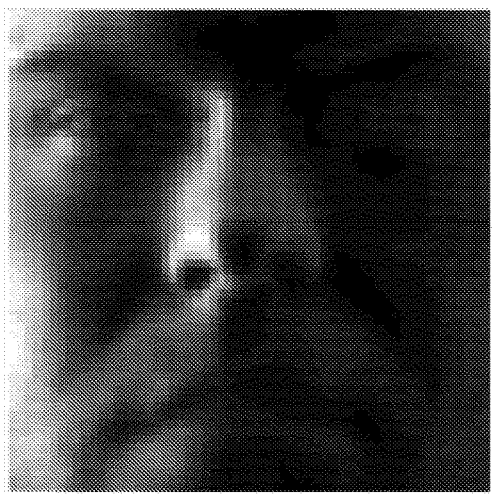

FIG. 6C is a graphical representation of a transform as may be applied to the gallery image in FIG. 6B such that a transformed gallery image would more closely correspond (e.g. in illumination, viewing aspect, posture, etc.) to the query image in FIG. 6A. In practice the transform may not be determined as a graphical construct (though such also is not excluded), but the transform is illustrated here as an example. Also, it is noted that the transform will not necessarily closely resemble either the query image, query model, gallery image, and/or gallery model (though close resemblance also is not excluded). Notably, the mouth in the transform of FIG. 6C is curved downward more deeply than either the query image of FIG. 6A or the gallery image of FIG. 6B, the range of variation in illumination is more extreme in FIG. 6C than in FIG. 6A or 6B, etc. The transform is not required to resemble either the gallery model or the query model (or for that matter the learning model) to any particular degree, but rather may be considered as set of directions for altering the gallery model to more closely correspond with the query model.

Although the images in FIG. 6A through FIG. 6D are two dimensional by necessity, it should be understood that the transform may be a three dimensional construct (if the transform is indeed a spatial construct at all; for certain embodiments, a non-graphical transform, e.g. a transform represented by mathematical relations, may be equally suitable). Likewise, as previously described, the transform may be determined through evaluation of a three dimensional query model and a three dimensional gallery model, rather than directly from two dimensional query and gallery images.

For at least certain embodiments, the transform may be referred to for convenience as an "illumination transfer", due to the transform including (in at least some embodiments) a map for transferring the apparent illumination of the query model to the gallery model. However, transforms for the present invention are not limited to illumination, and should not be understood as so limited unless otherwise specified herein.

Figure 6D:

In FIG. 6D a transformed gallery image is shown. The transformed gallery image represents a two dimensional projection of the gallery model for the gallery image in FIG. 6B after the transform in FIG. 6C is applied thereto. As may be noted, the transformed gallery image in FIG. 6D now more closely corresponds with the query image in FIG. 6A, than does the gallery image shown in FIG. 6B. By visual inspection, the illumination of the gallery face in the transformed gallery image shown in FIG. 6D is stronger from the right side of the query subject's face, better approximating the illumination of the query face in the query image shown in FIG. 6A. Likewise, the mouth pose and head tilt of the gallery face in the transformed gallery image shown in FIG. 6D more closely correspond with the query face in the query image shown in FIG. 6A.

Comparison of the query image against gallery images (subsequent to a transform according to the present invention being applied to those gallery images) thus is facilitated.

Figure 7:
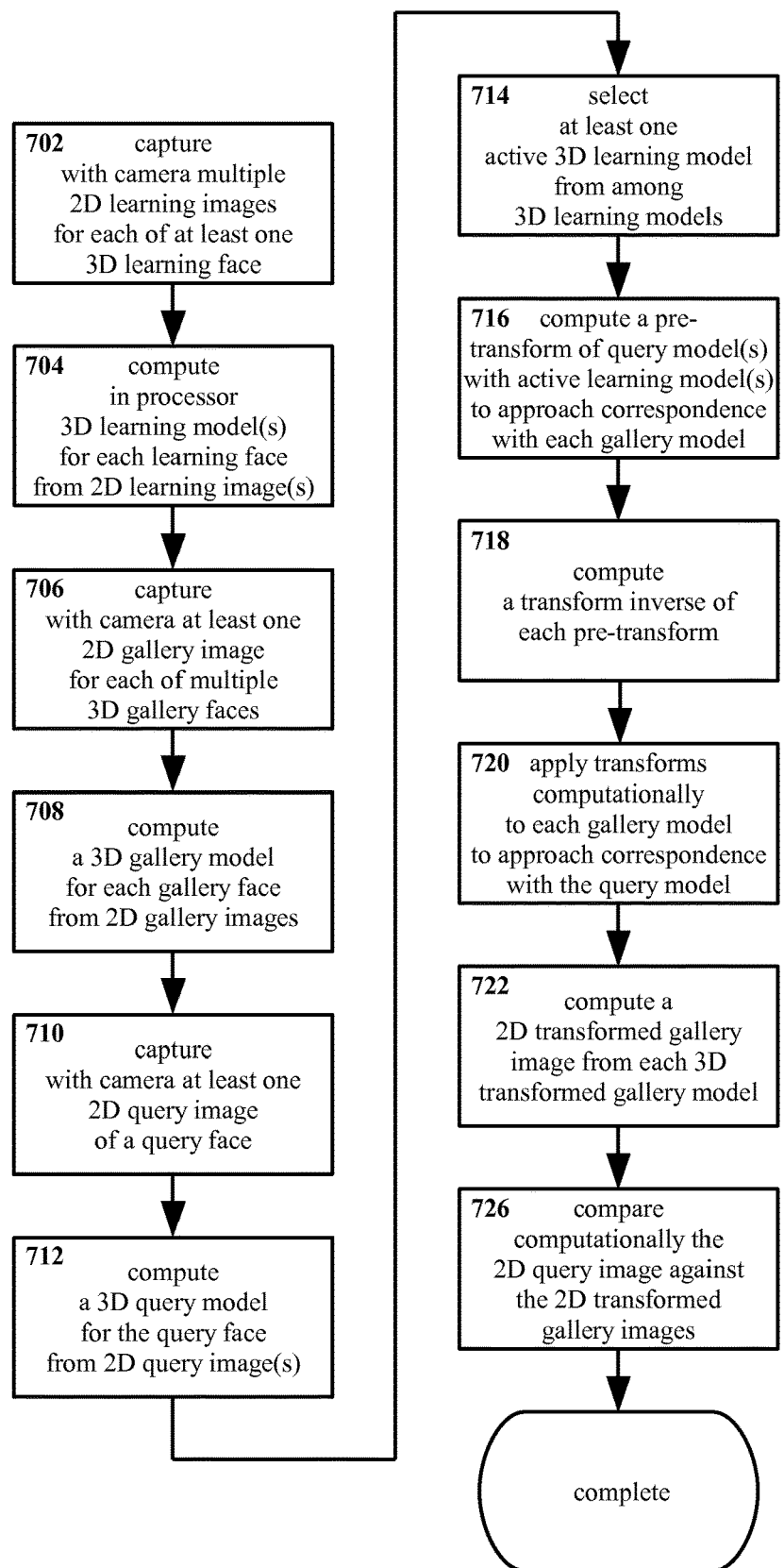
FIG. 7 shows an example embodiment of a method for identifying faces in images according to the present invention, incorporating camera capture of images, processor computation of models, and incorporation of a pre-transform, in flow chart form.

Now with reference to FIG. 7, a somewhat more concrete example method according to the present invention is described. In FIG. 7, an arrangement of the multiple two dimensional learning images are captured 702 with a camera, for at least one three dimensional learning face. For purposes of explanation, the camera may be a digital camera, and the learning images may be digital images, but this is an example only and other arrangements may be equally suitable. For learning images, including but not limited to digital images, in at least some such embodiments learning images may be treated mathematically as being vectors, e.g. by stacking the pixels of the learning images. The learning image may include information regarding properties such as texture, illumination, shape, etc. This is an example only, and other arrangements may be equally suitable.

It is noted that learning images may be captured 702 for two or more learning faces, though arrangements wherein only one learning face is so imaged may be equally suitable.

Also, as already noted certain steps and processes of the present invention may be subdivided. For example, in establishing learning images as in step 702 of the present invention, this might be considered as a sequence of sub-steps, e.g. establishing a unique combination of viewing aspect, illumination, subject configuration, texture conditions (e.g. wet, dry, oiled, made up, etc.) for a given learning image, capturing the learning image with a camera or other sensor, then establishing a new unique combination and capturing another learning image, etc. until the learning subject (face or otherwise) has been imaged sufficiently to support the function of the particular embodiment of the present invention in question. Likewise, even those sub-steps may be further divided, e.g. in a loop such as: set viewing aspect, set illumination, capture learning image; update (e.g. through some incremental change) illumination, capture learning image; repeat until all desired illumination settings for the viewing aspect are captured; update viewing aspect, set illumination, capture learning image; etc. As may be understood such sequences may be almost arbitrarily complex, including numerous features besides aspect and illumination, with many different settings or values for each. Such an arrangement (e.g. a given combination of viewing aspect, illumination, etc.) may be considered to be a "state" for a learning image, with learning images having unique states. That is, different learning images for a given learning subject may not show that learning subject with all image properties the same (e.g. the same viewing aspect, lighting, configuration, etc.) as for any other learning image for that same learning learning subject.

However, these are examples only, and other arrangements may be suitable.

Continuing in FIG. 7, at least one three dimensional learning model is computed 704 in a processor (e.g. determined computationally by executing executable instructions instantiated on a processor to process image data from the learning images also instantiated on the processor), utilizing the learning images. Typically though not necessarily, learning images captured 702 of each learning face may be treated collectively with regard to computing 704 one learning model therefrom; that is, all images of learning face one may be used to form a single model of learning face one, while all images of learning face two may be used to form a single model of learning face two. However, other arrangements may be equally suitable, including but not limited to excluding certain images, considering certain images of one learning subject when computing a learning model representing a different subject, etc.

Still with reference to step 704 in FIG. 7, consideration of multiple learning faces (multiple learning image sets, multiple learning models, etc.) may be advantageous in at least certain embodiments of the present invention. For example, different learning models might be determined for different genders, ethnicities, age ranges, etc. Individual learning models thus might be selected as being particularly well-suited to certain query faces, for example, if the query face is known to be (or suspected to be) a female in the age range of 12 to 15 years (e.g. for a search in response to an "Amber alert"), considering specifically a learning model based on a learning face corresponding to that gender and age range may facilitate greater confidence in identification of the query face, may reduce computational requirements, etc. However, while consideration of a single specific learning model, or a sub-set of a larger group of learning models, is permitted according to the present invention, such is not required for all embodiments.

Moving on in FIG. 7, at least one gallery image is captured 706 with a camera, for multiple gallery faces. The camera may be a digital camera, and the gallery images may be digital images, but this is an example only and other arrangements may be equally suitable. Typically though not necessarily the gallery images are of at least substantially uniform viewing aspect, illumination, facial posture, etc. For example, full frontal images with strong illumination and neutral facial postures such as may be established for driver's licenses, passports, etc. may be suitable, though the present invention is not limited only thereto.

Again, and as noted with regard to step 702, other steps and processes of the present invention may be subdivided. For example, in establishing gallery images as in step 706, such step may be broken into several substeps, e.g. establish a standardized viewing aspect, establish a standardized illumination, establish a standardized configuration (e.g. facial posture), etc., capture the gallery image, then repeat for other gallery subjects (e.g. faces). This likewise may apply to other steps. In addition, with regard to image states (e.g. values for different image properties such as viewing aspect, illumination, etc.) gallery images may be at least somewhat similar states, and/or at least some image properties that are similar among gallery images. However, these are examples only, and other arrangements may be suitable.

A gallery model is computed 708 in a processor for each gallery face, utilizing the gallery images (e.g. determined computationally by executing executable instructions instantiated on a processor to process image data from the gallery images also instantiated on the processor). For arrangements wherein only one gallery image is obtained for each gallery face, each individual gallery model likewise may be computed from only a single image. Regardless of the number of gallery images used to compute a given gallery model, learning images and/or learning models may inform the computation of some or all of the gallery models.

Typically, though not necessarily, the number of gallery faces, and thus the number of gallery models, may be large, e.g. hundreds, thousands, millions, etc. However, the present invention is not particularly limited with regard to how many gallery faces may be considered, and/or how many gallery models may be computed. For purposes of the example in FIG. 7 multiple gallery faces and gallery models are considered, but in other embodiments only a single gallery face and/or a single gallery model may be considered. Also, as noted previously, each gallery face may be represented by only one gallery image Still referring to FIG. 7, at least one query image is captured 710 with a camera, for multiple gallery faces. The camera may be a digital camera, and the gallery images may be digital images, but this is an example only and other arrangements may be equally suitable.

It is noted that the camera(s) capturing the query image(s) may not necessarily be the same camera(s) capturing the learning and/or gallery images, nor are the camera(s) capturing the learning and/or gallery images necessarily the same camera(s). Though a single camera capturing learning, gallery, and/or query images is not excluded, in practice different cameras may capture some or all of each different type of image (learning, gallery, and query). For example, learning images may be captured with cameras incorporated into an imaging station at a research site, gallery images captured with cameras at a Department of Motor Vehicles, and query images with surveillance cameras, television cameras, phone cameras, pocket cameras, wearable cameras such as may be incorporated into a head mounted display, etc.

Typically though not necessarily the query images may be of arbitrary or "as obtained" condition with regard to viewing aspect, illumination, facial posture, etc. That is, considering a "state" of image properties for a query image, the state and/or at least some image properties of the query image may not be the same as any state and/or image properties of the gallery images and/or learning images. More concretely, a query image may not have similar viewing aspect, similar illumination, similar configuration (e.g. facial posture), etc. of any of the gallery images, or even any of the (potentially more comprehensive) learning images. Rather, a query image captured with a camera on a head mounted display might be captured with ambient lighting, from whatever viewing aspect happens to exist between camera and query face, with whatever expression the query face may have at the time, etc.

Moving on in FIG. 7, a query model is computed 712 in a processor for each query face, utilizing the query images (e.g. determined computationally by executing executable instructions instantiated on a processor to process image data from the query images also instantiated on the processor). For arrangements wherein only one query image is obtained for the query face, the query model likewise may be computed from only a single image. Regardless of the number of query images used to compute a given gallery model, learning images and/or learning models may inform the computation of some or all of the query models.

It is noted that the processor(s) computing the query model(s) may not necessarily be the same processor(s) computing the learning and/or gallery models, nor are the processor(s) computing the learning and/or gallery models necessarily the same processors(s). Though a single processor computing learning, gallery, and/or query models is not excluded, in practice different processors may compute some or all of each different type of image (learning, gallery, and query). For example, learning models may be computed with processors associated with an imaging station at a research site, gallery models computed with processors at a Department of Motor Vehicles, and query models with processors proximate and/or incorporated into surveillance systems, phones, pocket cameras, processors incorporated into a head mounted display, etc.

Again as previously noted, each query face may be represented by only one query image.

Typically only a single query face, and thus a single set of query images and a single query model, may be considered at once. For example, one unknown face at a time may modeled, transformed, etc. so as to facilitate identification against known faces, rather than matching many unknown faces together to many known faces. However, the present invention is not particularly limited in this regard, and other arrangements may be equally suitable.

Moving on in FIG. 7, at least one of the three dimensional learning models (computed in step 704) is selected 714 as an active learning model. As noted, multiple learning models may be computed 704, and certain advantages may attach to considering certain learning models and/or not considering other learning models (e.g. considering a learning model more particular to a given query face may produce more reliable results, excluding a learning model clearly unrelated to a given query face may reduce processing requirements, etc.).

The present invention is not particularly limited with regard to the manner in which active learning models are selected 714 from among available learning models. Such selection may be carried out by a person, e.g. viewing a query image and judging that the query subject is female and thus manually selecting one or more query models associated with female faces and/or facial characteristics. Alternately, such selection might be automated in some fashion, carried out through computations performed on a processor with executable instructions instantiated thereon. Other arrangements also may be equally suitable.

If only one learning model is computed 704, then typically that one learning model may be considered to be selected 714 by default, or step 714 may be skipped. Likewise, if all available learning models are considered for a given query model, step 714 may be skipped.

Still with reference to FIG. 7, a pre-transform is calculated 716 of the query model with the active learning model (for purposes of simplicity, it is assumed that only a single query model and active learning model are considered in this example, though multiple query models and/or multiple active learning models may be equally suitable), wherein the pre-transform when applied to the query model causes the query model (as transformed) to approach correspondence with each gallery model.

Although for simplicity, certain examples herein refer to "a transform", in practice the transform (and/or a pre-transform, as in the example presented here) may include multiple steps and/or operations. For example, transferring illumination between query and gallery models (so that the transformed gallery model has illumination similar to the query model, or vice versa) may be carried out as a separate operation from aligning viewing aspect between query and gallery models, and conforming pose between query and gallery models may be yet a separate operation.

For purposes of explanation, examples are provided herein describing steps for a pre-transform that includes two major steps: an example illumination transfer, and a subsequent example viewing aspect alignment incorporating aspects of the illumination transfer (such that the transform taken together considers both illumination and viewing aspect). It may be understood that similar transforms may also consider facial posture adjustment, and/or other features. However, these are examples only, and the present invention is not limited only thereto.

It is emphasized that according to the present invention, regardless of the particulars of how the pre-transform and/or transform is carried out (e.g. what mathematical or other approaches are utilized), at least a portion of the pre-transform and/or transform is carried out in three dimensions, with respect to three dimensional models. Thus, transferring illumination may be carried out with regard to three dimensions, alignment may be carried out with regard to three dimensions, etc.

Indeed, carrying out such pre-transform/transform operations in three dimensions—illumination transfer, alignment, etc.—is a notable advantage of the present invention, along with sparse correspondence enabled through the consideration of three dimensional models as already noted. However, although these examples may be advantages of the present invention, they are not necessarily the only advantages of the present invention.

The various operations described with regard to step 716 may be for example determined computationally by executing executable instructions instantiated on a processor. However other arrangements may be equally suitable.

Moving on in FIG. 7, a transform is computed 718 (e.g. determined computationally by executing executable instructions instantiated on a processor) that is the inverse of each pre-transform. That is, if (as in this example) one or more pre-transforms are computed first that cause the query model to approach correspondence with the gallery models, then an inverse of such transforms typically may cause the gallery models to approach correspondence with the query models.

Pre-transforms for causing a query model to approach correspondence the gallery models (rather than causing gallery models to approach correspondence with a query model) may be advantageous in at least certain embodiments. For example, it may be more convenient (e.g. in terms of mathematics and/or computation) to determine transforms that share a common starting state (the query model) with many end states (the gallery models), rather than determining transforms that have many starting states (the gallery models) but that reach a common end state (the query model).

However, this is an example only, and determining pre-transforms and transforms that are inverses thereof is not necessarily required for all embodiments. Other arrangements may be equally suitable.

Still with reference to FIG. 7, the transforms are applied 720 to the gallery models, such that the gallery models approach correspondence with the query model. The transforms may be so applied for example computationally by executing executable instructions instantiated on a processor, though the present invention is not particularly limited with regard to how the transforms are applied.

With the transforms applied to the original gallery models, one or more transformed gallery models may be available.

Continuing in FIG. 7, a two dimensional transformed gallery image is computed 722 from each three dimensional transformed gallery model, e.g. by executing executable instructions instantiated on a processor, though the present invention is not particularly limited with regard to how the transformed gallery images are computed.

The two dimensional query image is then compared 726 against the two dimensional transformed gallery images, e.g. to determine whether the query face in the query image is the same as one of the gallery faces in the transformed gallery images. The comparison may be carried out computationally, for example by executing executable instructions instantiated on a processor, though the present invention is not particularly limited with regard to how the comparison is performed.

In practice, the query image may not be, and is not required to be, an exact match for any of the transformed gallery images. Rather, the query image may approximate one or more of the transformed gallery images. The present invention is not particularly limited with regard to a degree to which the query image must match any of the transformed gallery images in order to be considered to identify the query face and a gallery face as being "the same face", nor does the present invention even necessarily require that any such determination be made. For at least certain embodiments of the present invention, confidence levels may be determined and/or associated with certain matches or potential matches, e.g. the query image matches one of the transformed gallery images to a confidence of 99.9% (or 99%, 98%, 97.5%, 95%, 75%, etc.). Furthermore, multiple matches may be suitable for at least certain embodiments of the present invention (even when two different transformed gallery images represent two different gallery faces).

Numerous variations regarding features and parameters of the present invention may be suitable. Certain such variations have already been noted, but additional comments regarding some variations may be illuminating. Not all variations are necessarily presented herein, nor is the present invention limited only to the variations specifically described.

Figure 8:
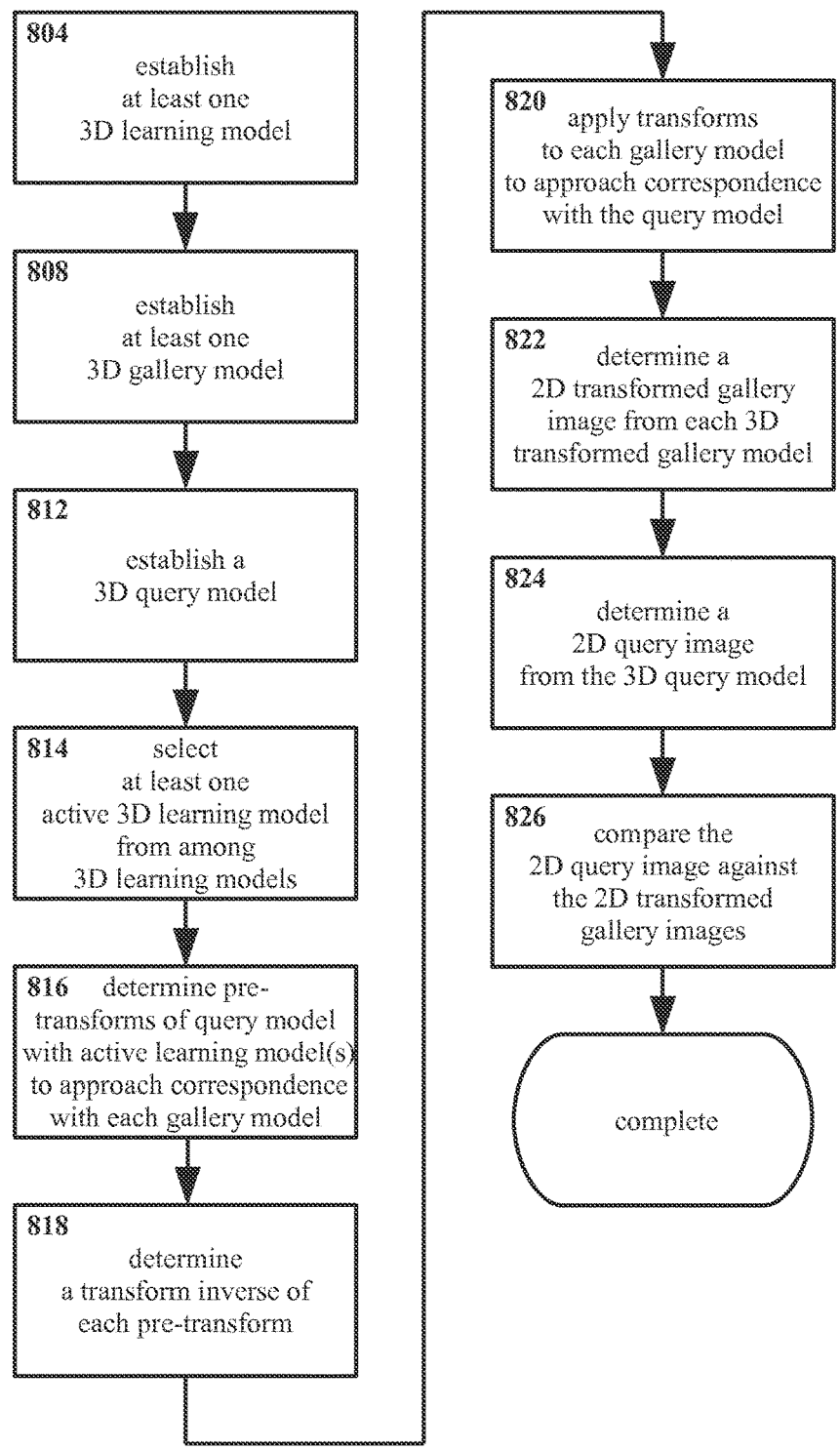
FIG. 8 shows an example embodiment of a method for identifying non-specified subjects according to the present invention, considering three dimensional models directly without necessarily determining those models from two dimensional images.

With reference to FIG. 8, therein is shown another example method according to the present invention. Where the arrangements in FIG. 1 and FIG. 7 assumed that inputs for learning, gallery, and query faces would be in the form of two dimensional images, the present invention is not limited only thereto. As shown and described with regard to the arrangement of FIG. 8, at least some inputs for learning, gallery, and/or query subjects may be in the form of three dimensional models, without necessarily determining those three dimensional models from two dimensional images.

Any of the three dimensional learning, gallery, and query models may be established as three dimensional models, and/or may be determined from two dimensional learning, gallery, and query images respectively, in any combination. Thus, in certain embodiments of the present invention a three learning dimensional learning model may be established as a three dimensional model, e.g. by three dimensional laser scanning and/or other three dimensional scanning processes of a learning face and/or other learning subject, while in the same embodiments the three dimensional gallery and/or query models are determined from two dimensional gallery and/or learning images respectively, the gallery and/or learning images being established e.g. by digital photography and/or other two dimensional imaging processes of a gallery face or other gallery subject and/or a query face and/or other query subject.

In addition, where FIG. 1 and FIG. 7 refer specifically to human faces as learning, gallery, and query subjects, the present invention is limited only to human faces as subjects. Other subjects, including but not limited to animals, physical objects such as firearms, blades, other weapons, bullets, cars and other vehicle, non-human animals, plants, landscapes, trees, rock formations, buildings, and/or elements or portions of any such, may be equally suitable.

In FIG. 8, at least one three dimensional learning model is established 804 of at least one learning subject The present invention is not particularly limited with regard to how the learning model may be established. Where in examples of FIG. 1 and FIG. 7 the three dimensional learning model(s) are determined (e.g. computationally) based on two dimensional learning images, the present invention is not limited only to determining three dimensional learning models from two dimensional learning images. For example, a three dimensional learning model may be established through laser scanning, three dimensional tomography, time-of-flight measurements, ultrasonic mapping, holographic imaging, plenoptic photography, etc. Alternately, a three dimensional learning model may be constructed computationally (e.g. through executable instructions instantiated on a processor), without utilizing direct imaging or other sensing of a living human.

Learning models have been described previously herein. To reiterate briefly, a learning model provides a model of what a subject and/or a class of subjects (e.g. faces, firearms, automobiles, etc.) "should look like", and may include information including but not limited to texture, shape, illumination, and/or configuration, and variations thereof (e.g. with regard to texture a face or automobile may be modeled exhibiting both dry and wet surface conditions, while with regard to configuration an automobile may be modeled exhibiting both opened and closed doors, etc.).

These are examples only, and other arrangements may be equally suitable.

At least one three dimensional gallery model is established 808 of at least one three dimensional gallery subject. The present invention is not particularly limited with regard to how the gallery model(s) may be established, as with establishment of the learning model in step 804. Gallery models have been described previously herein. To reiterate briefly, a gallery model represents a "target" for comparison, typically though not necessarily representing a particular example of a subject or class of subjects. For example, considering firearms as a subject, a gallery model may represent M1918 Browning Automatic Rifles (or more particularly the M1918A2 sub-type, or even a specific individual weapon), enabling determination as to whether some other image and/or model also represents an M1918 BAR. These are examples only, and other arrangements may be equally suitable.

Still with reference to FIG. 8, at last one three dimensional query model of a three dimensional query subject is established 812. The present invention is not particularly limited with regard to how the query model may be established, as with the learning and gallery models in steps 804 and 808. Query models have been described previously herein. To reiterate briefly, a gallery model represents the subject to be compared with and/or identified from the gallery and/or learning models. Typically though not necessarily the query model may be "unknown", in the sense that while the query subject represented by the query model may be recognizable as a human face (or an automobile, an aircraft, etc.) the identity of that query subject may not be known. These are examples only, and other arrangements may be equally suitable.

At least one active learning model is selected 814 from among the learning models. This step may be at least somewhat similar to step 714 in FIG. 7, already described herein.

Again with reference to FIG. 8, pre-transforms are determined 816 for the query model with the active learning model(s) to approach correspondence with the gallery models. Transforms that represent the inverses of the pre-transforms are then determined 818, the transforms enabling the gallery models with the active learning model(s) to approach correspondence with the query model. The transforms are applied 820 to the gallery models to approach correspondence with the query model. These steps may be at least somewhat similar to steps 716, 718, and 720 in FIG. 7, already described herein.

Two dimensional transformed gallery images are determined 822 from the three dimensional transformed gallery models. This step may be at least somewhat similar to step 722 in FIG. 7, already described herein. It is noted that in the example of FIG. 7, the three dimensional gallery models themselves were computed from two dimensional gallery images, and determining the two dimensional transformed gallery images may be considered to represent a reversal of the earlier two dimensional to three dimensional computation. By contrast, in the example of FIG. 8, step 822 does not necessarily represent a reversal of a two dimensional to three dimensional determination, since the three dimensional gallery models where not themselves necessarily determined from two dimensional gallery images.

Continuing in FIG. 8, a two dimensional query image is determined 824 from the three dimensional query model.

Typically though not necessarily, the two dimensional query image may be determined 824 computationally, through spatial analysis of features within the three dimensional query model, though other arrangements may be equally suitable. However, the present invention is not particularly limited with regard to how the two dimensional query image may be determined 824.

The two dimensional query image is compared 826 against the two dimensional transformed gallery images, e.g. to determine whether the query subject is the same as any of the gallery subjects.

Although the example of FIG. 8 shows determination of two dimensional transformed gallery images and a two dimensional query image in steps 822 and 824 respectively, and comparison of the two dimensional query image against the two dimensional transformed gallery images in step 826, the present invention is not limited only to two dimensional comparison (nor are two dimensional images necessarily required to be determined, in particular though not only for arrangements wherein two dimensional comparison does not take place). For example, in certain embodiments the three dimensional query model may be directly compared against the three dimensional transformed query models, without necessarily producing respective two dimensional images therefrom. This may be useful for example in an arrangement (as in FIG. 8) wherein the three dimensional query model is established without necessarily utilizing a two dimensional query image. That is, there may be no "original" two dimensional query image, and so the comparison may be made using the original three dimensional query model.

In addition, with regard to the example of FIG. 8 overall, it may be seen therefrom that conversion between two dimensional images and three dimensional models may for at least certain embodiments of the present invention be optional. Furthermore, although FIG. 7 shows all of the two dimensional learning, gallery, and query models being computed from two dimensional learning, gallery, and query images respectively, and FIG. 8 shows an arrangement with none of the three dimensional learning, gallery, and query models being determined from two dimensional images, the present invention is not limited to "either or", and variations thereon also may be suitable. For example, an embodiment wherein a three dimensional learning model is established without utilizing two dimensional learning images, but the three dimensional gallery and query models are determined from two dimensional gallery and query images respectively, also may be suitable.

Figure 9:
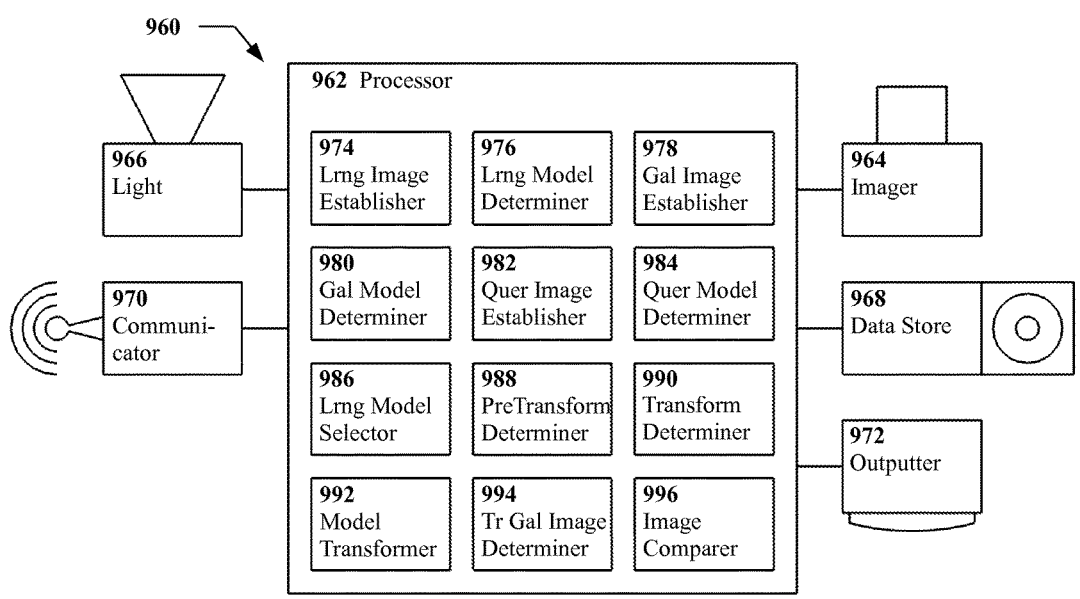
FIG. 9 shows an example embodiment of an apparatus for identifying subjects according to the present invention, in schematic form.

Now with reference to FIG. 9, an example apparatus 960 according to the present invention is shown therein, in schematic form. Certain functions and/or features relating to the apparatus 960 have been explained previously herein, e.g. with regard to example methods in FIG. 1, FIG. 7, and FIG. 8, and this description is not necessarily repeated with regard to FIG. 9.

In the example shown in FIG. 9, the apparatus 960 includes a processor 962 adapted to execute instructions instantiated thereon. A wide range of processors 960 may be suitable for use with the present invention, and the present invention is not particularly limited with regard thereto. Suitable processors may include, but are not limited to, digital electronic processors. Processors may be physical and/or virtual (e.g. "cloud" processors), may be dedicated and/or general purpose, and may be either unitary or multiple (e.g. several physical processors operating in parallel). Other arrangements also may be equally suitable.

The apparatus also includes an imager 964 adapted to establish two dimensional images, in communication with the processor 962. As illustrated, the imager 964 is represented as a camera such as a digital camera, but this is an example only and the present invention is not limited only thereto.

The apparatus 960 as shown in FIG. 9 includes a light 966 adapted to produce and/or direct illumination, in communication with the processor 962. As illustrated, the light 966 is represented as a directional lamp, but this is an example only and the present invention is not limited only thereto.

The imager 964 and light 966 may be optional for at least certain embodiments of the present invention. If two dimensional images (and/or three dimensional models absent two dimensional images) and illumination therefor may be established alternately, the imager 964 and/or light 966 may be omitted.

Still with reference to FIG. 9, the apparatus 960 as shown therein includes a data store 968 and a communicator 970 in communication with the processor 962. The data store is adapted to store data, including but not limited to two dimensional images, three dimensional models, and executable instructions adapted to be instantiated on the processor 962. The communicator is adapted to send and/or receive data, e.g. for communication to and/or from the processor 962, including but not limited to two dimensional images, three dimensional models, and executable instructions adapted to be instantiated on the processor 962. The present invention is not particularly limited with regard to suitable data stores 968 and/or communicators 970. Suitable data stores 968 may include but are not limited to hard drives, solid state drives, and virtual storage such as cloud memory. Suitable communicators may include but are not limited to wired and/or wireless connectors. Suitable communicators also may include input devices such as keyboards for keyed input, microphones for voice input, sensors for gestural, positional, and/or motion-related input, etc. The data store 968 and/or communicator 970 may be optional for at least certain embodiments, but may be useful in other embodiments for storing and/or communicating two dimensional learning, gallery, and/or query images, three dimensional learning, gallery, and/or query models, executable instructions, etc.

The apparatus 960 as shown in FIG. 9 also includes an outputter 972. As illustrated in FIG. 9, the outputter 972 is represented as a visual display or "screen", but this is an example only and the present invention is not limited only thereto. The outputter 972 may be adapted to output information so as to be sensed by a user, viewer, etc. of the apparatus 960, or some other person or entity. Such information may include, but is not limited to, two dimensional learning, gallery, and query images, three dimensional learning, gallery, and query models, and/or information relating thereto. The outputter 972 may be optional for at least certain embodiments of the present invention, but nevertheless may be useful for others.

An apparatus 960 according to the present invention is not limited only to those elements shown in FIG. 9, and other elements may be present.

Still with reference to FIG. 9, the processor 962 shown therein includes data entities 974 through 996 disposed thereon, e.g. as associations of executable instructions and/or data instantiated upon the processor 962.

Although in the example of FIG. 9 elements 974 through 996 are all shown to be disposed on a single processor 962, this is an example only. Other arrangements wherein analogs to some or all of elements 974 to 996 are present on each of several processors also may be equally suitable (including possible duplication of such elements on multiple processors); one such example is shown subsequently herein in FIG. 10A through FIG. 10C.

Moreover, although elements 974 through 996 are shown divided into specific and discrete units in FIG. 9, this is an example only, and is presented at least in part for clarity. So long as the functions of the present invention are enabled, elements 974 through 996 may be combined, further subdivided, etc.

Continuing with reference to FIG. 9, elements 974 through 996 as shown include a learning image establisher 974, a learning model determiner 976, a gallery image establisher 978, a gallery model determiner 980, a query image establisher 982, a query model determiner 984, a learning model selector 986, a pre-transform determiner 988, a transform determiner 990, a model transformer 992, a transformed gallery image determiner 994, and an image comparer 996. As noted previously, these elements 974 through 996 are presented in FIG. 9 as data entities instantiated on the processor 962, though other arrangements may be equally suitable.

The learning image establisher 974 is adapted to establish at least one two dimensional learning image, e.g. by obtaining learning images from the imager 964, receiving learning images from the communicator 970, reading learning images from the data store 968, etc. Learning images have been previously described herein.

The learning model determiner 976 is adapted to determine at least one three dimensional learning model from two dimensional learning images, e.g. computationally within the processor 962. Learning models have been previously described herein.

The gallery image establisher 978 is adapted to establish at least one two dimensional gallery image, e.g. by obtaining gallery images from the imager 964, receiving gallery images from the communicator 970, reading gallery images from the data store 968, etc. Gallery images have been previously described herein.

The gallery model determiner 980 is adapted to determine at least one three dimensional gallery model from two dimensional gallery images, e.g. computationally within the processor 962. Gallery models have been previously described herein.

The query image establisher 982 is adapted to establish at least one two dimensional query image, e.g. by obtaining query images from the imager 964, receiving query images from the communicator 970, reading query images from the data store 968, etc. Query images have been previously described herein.

The query model determiner 984 is adapted to determine at least one three dimensional query model from two dimensional query images, e.g. computationally within the processor 962. Query models have been previously described herein.

The learning model selector 986 is adapted to select at least one active learning model from among three dimensional learning models, e.g. computationally within the processor 962, through input delivered via the communicator 970, etc. Active learning models have been previously described herein.

The pre-transform determiner 988 is adapted to determine a pre-transform for a query model with an active learning model to approach correspondence with the gallery models, e.g. computationally within the processor 962. That is, the query model if subject to the pre-transform would more closely correspond with the gallery models in terms of at least one parameter (e.g. texture, shape, illumination, posture, etc.) than if not subject to the pre-transform. Typically the pre-transform is and/or includes portions that are three-dimensional, e.g. a three dimensional illumination transfer, a three dimensional spatial alignment, etc. Pre-transforms have been previously described herein.

The transform determiner 990 is adapted to determine transforms for gallery models with active learning models to approach correspondence with a query model, e.g. computationally within the processor 962. That is, the gallery models if subject to the transform would more closely correspond with the query model in terms of at least one parameter (e.g. texture, shape, illumination, posture, etc.) than if not subject to the transform. Typically the transform is and/or includes portions that are three-dimensional, e.g. a three dimensional illumination transfer, a three dimensional spatial alignment, etc. Transforms may be an inverse of pre-transforms, and have been previously described herein.

The model transformer 992 is adapted to apply transforms to gallery models such that the gallery models (as transformed) approach correspondence with a query model. Transforms and application of transforms to three dimensional models have been previously described herein.

The transformed gallery image determiner 994 is adapted to determine two dimensional transformed gallery images from the three dimensional transformed gallery models (i.e. the gallery models after the transform is applied thereto). Transformed gallery images have been previously described herein.

The image comparer 996 is adapted to compare a two dimensional query image against two dimensional transformed gallery images. Such comparison has been previously described herein.

As has been noted, although FIG. 9 shows an integral apparatus 960 according to the present invention, it also may be equally suitable for other embodiments of the present invention for elements and/or groups of elements to be distinct and/or separated in time, space, etc. from one another. For example, learning images may be established and learning models determined at one place and time by one set of elements, gallery images established and gallery models determined at another place and time by another set of elements, etc.

Figure 10A:
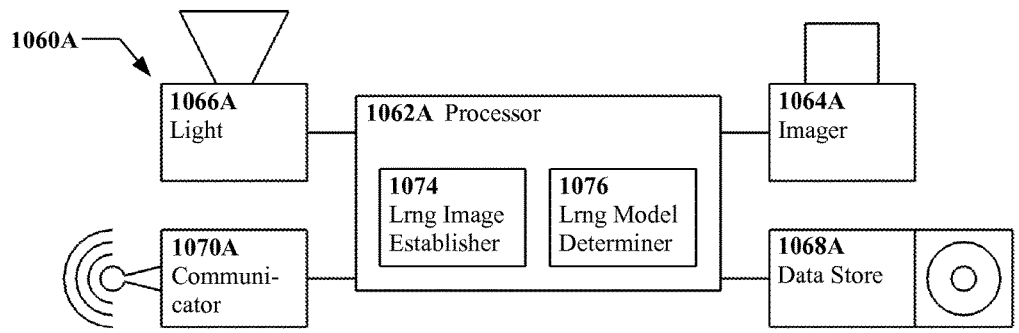
FIG. 10A through FIG. 10C show an example embodiment of an apparatus for identifying subjects according to the present invention as divided into sub-units, in schematic form.
Figure 10B:
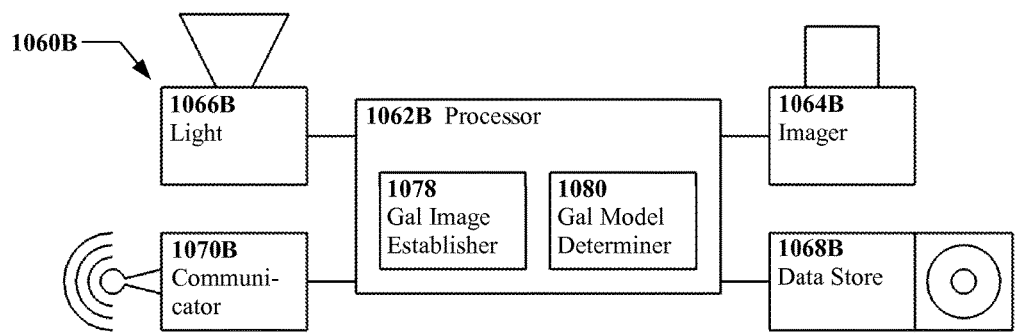
Figure 10C:
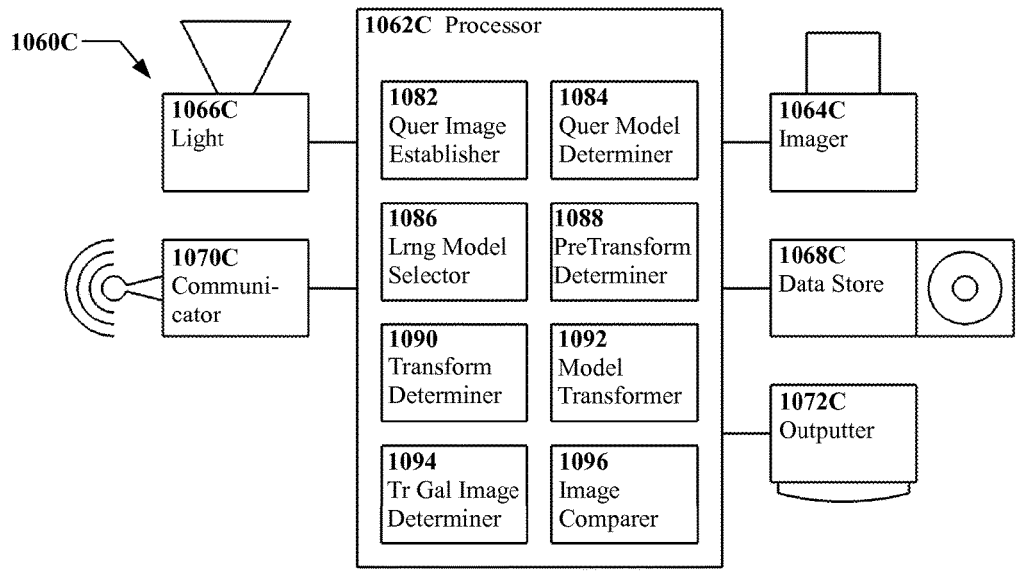

An example arrangement of such a non-integral apparatus according to the present invention is shown in FIG. 10A through FIG. 10C, in schematic form. Therein, apparatuses 1060A, 1060B, and 1060C are shown, and are adapted to interact cooperatively. Elements 1060A, 1060B, and 1060C are numbered similarly, but uniquely; although it may be considered that elements 1060A, 1060B, and 1060C are all part of a single apparatus, it may be equally suitable to consider elements 1060A, 1060B, and 1060C as being distinct apparatuses, which may but are not required to cooperate.

With reference to FIG. 10A, an apparatus 1060A is shown therein including a processor 1062A, with an imager 1064A, a light 1066A, a data store 1068A, and a communicator 1070A in communication with the processor 1062A. Two data entities 1074 and 1076 are shown disposed on the processor 1062A, specifically a learning image establisher 1074 and a learning model determiner 1076.

As may be understood, the apparatus 1060A in FIG. 10A thus may be adapted collectively to acquire two dimensional learning images of some learning subject (e.g. a human face), and process those images to generate three dimensional learning models. As a more concrete example, the apparatus 1060A may be an imaging station at a research facility, though this is an example only and other arrangements may be equally suitable.

With reference now to FIG. 10B, an apparatus 1060B is shown therein including a processor 1062B, with an imager 1064B, a light 1066B, a data store 1068B, and a communicator 1070B in communication with the processor 1062B. Two data entities 1078 and 1080 are shown disposed on the processor 1062B, specifically a gallery image establisher 1076 and a gallery model determiner 1080.

As may be understood, the apparatus 1060B in FIG. 10B thus may be adapted collectively to acquire two dimensional gallery images of gallery subjects (e.g. a human faces), and process those images to generate three dimensional learning models. As a more concrete example, the apparatus 1060B may be a photography desk at a Department of Motor Vehicles, though this is an example only and other arrangements may be equally suitable.

With reference to FIG. 10C, an apparatus 1060C is shown therein including a processor 1062C, with an imager 1064C, a light 1066C, a data store 1068C, a communicator 1070C, and an outputter 1072C in communication with the processor 1062C. (As noted previously, at least certain elements of apparatus according to the present invention may be optional. For example, where the apparatus 1060C in FIG. 10C includes an outputter 1072C, apparatuses 1060A and 1060B in FIG. 10A and FIG. 10B respectively do not.) Data entities 1082 through 1096 are shown disposed on the processor 1062C, specifically a query image establisher 1082, a query model determiner 1084, a learning model selector 1086, a pre-transform determiner 1088, a transform determiner 1090, a model transformer 1092, a transformed gallery image determiner 1094, and an image comparer 1096.

As may be understood, the apparatus 1060C in FIG. 10C thus may be adapted collectively to acquire two dimensional query images of some query subject (e.g. a human face), and process those images to generate three dimensional query models. As a more concrete example, the apparatus 1060C may be a wearable device such as a head mounted display, although this is an example only and other arrangements may be equally suitable.

Figure 11A:
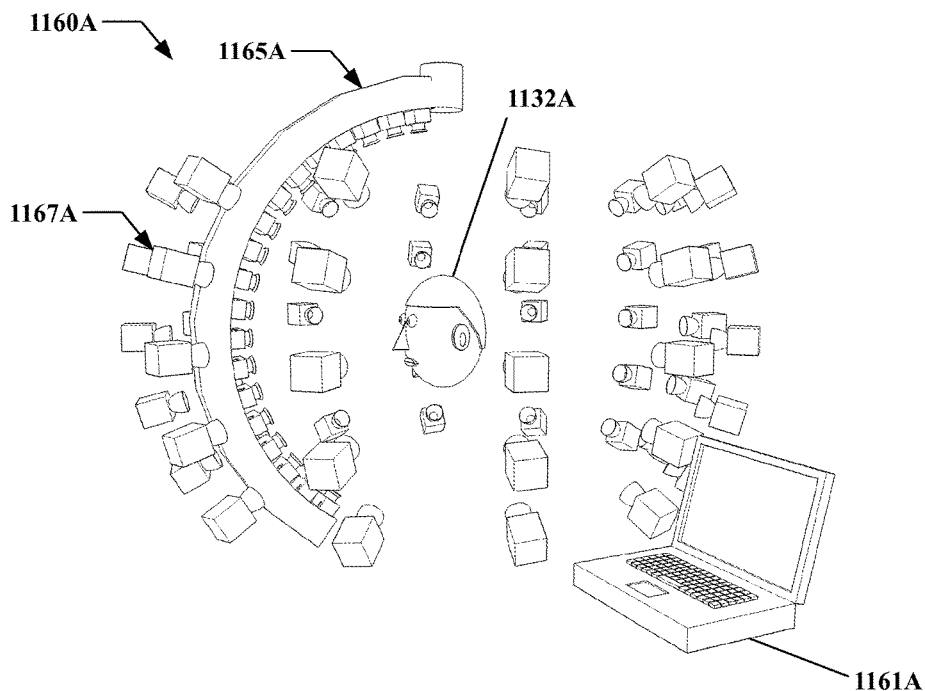
FIG. 11A through FIG. 11C show an example embodiment of an apparatus for identifying subjects according to the present invention as divided into sub-units, in perspective view.
Figure 11B:
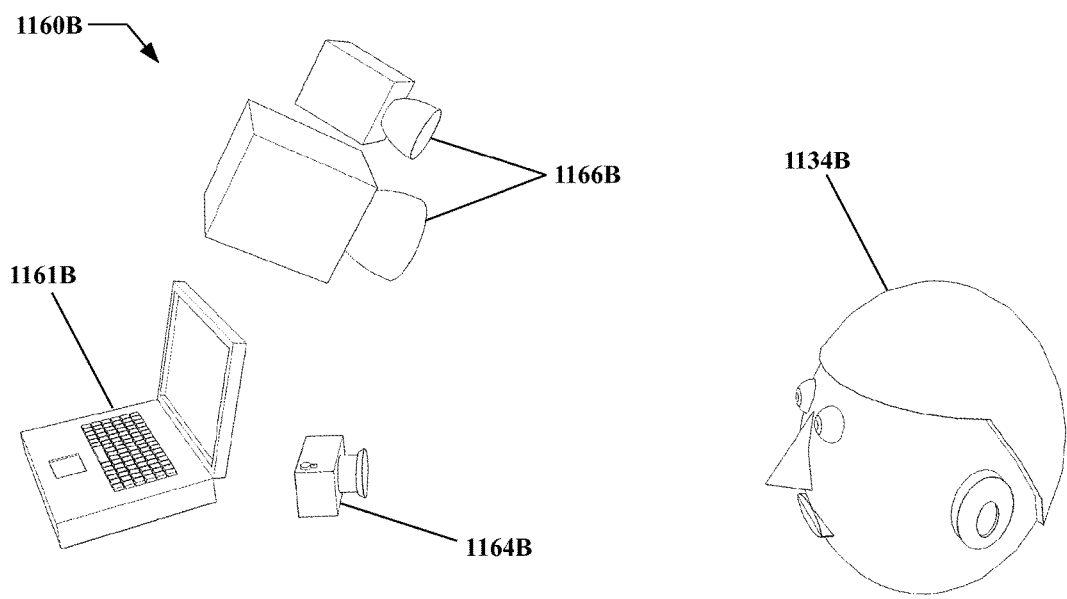
Figure 11C:
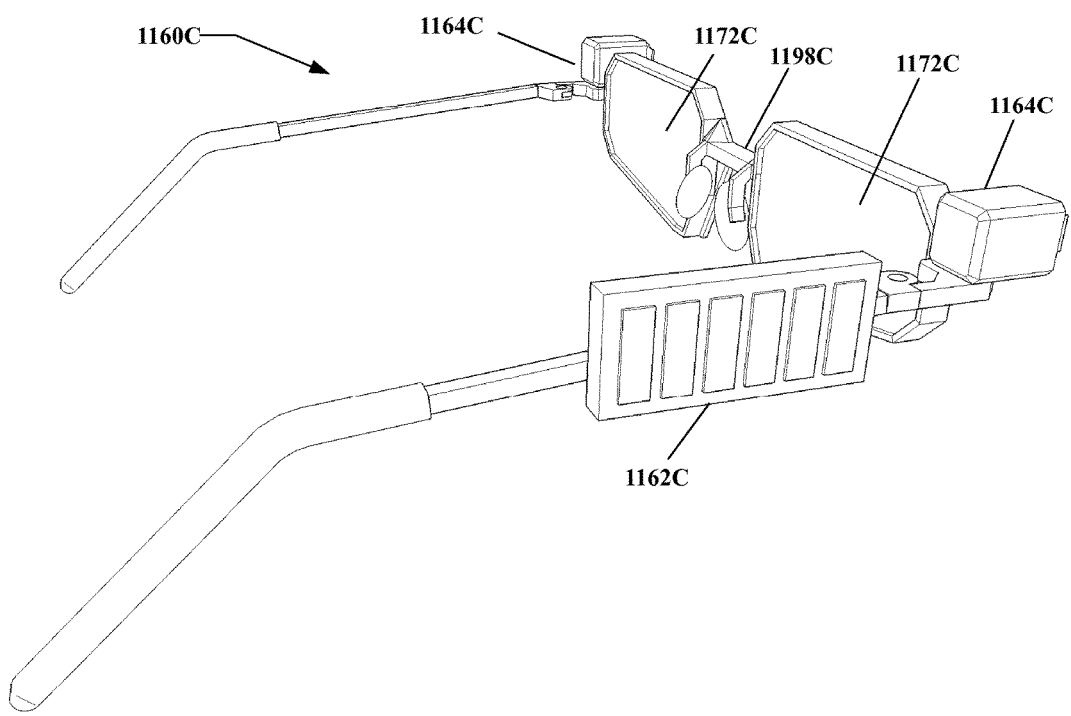

Turning now to FIG. 11A through FIG. 11C, an example arrangement of a non-integral apparatus according to the present invention is shown in perspective views. The arrangements shown in perspective view in FIG. 11A through FIG. 11C may to at least some degree parallel the arrangements shown in schematic form in FIG. 10A through FIG. 10C.

With reference to FIG. 11A, an apparatus 1160A is shown therein. A laptop computer 1161A is shown; although not directly visible in perspective view, typically a laptop computer 1161A such as shown may include features such as a processor, a data store, a communicator (keyboard, touch pad, wifi card, etc.), an outputter (display screen), etc. Though also not visible, a processor in the laptop computer 1161A may support instantiated thereon data entities such as a learning image establisher and a learning model determiner.

Also in FIG. 11A, an imaging array 1165A with imagers thereon (the imagers being shown but not individually numbered in FIG. 11A) arranged in an arc to facilitate capture of two dimensional learning images in a vertical arc, the array 1165A also being rotatable to facilitate capture of two dimensional learning images in a horizontal arc; such an array may enable capture of two dimensional learning images from a wide variety of viewing aspects in an efficient manner (and may for example be controlled by a processor in the laptop computer 1161A).

FIG. 11A also shows a lighting array 1167A of lights (again shown but not individually numbered), disposed so as to produce illumination from a variety of directions. A learning subject 1132A depicted as a human face is shown in FIG. 11A for explanatory purposes (e.g. to show a subject as may be imaged with the relative to the imaging array 1165A and the lighting array 1167A); however, the learning subject 1132A should not be interpreted as being an integral part of an apparatus according to the present invention.

As may be understood, the apparatus 1160A in FIG. 11A thus may be adapted collectively to acquire two dimensional learning images of some learning subject (e.g. a human face), and process those images to generate three dimensional learning models. Such an apparatus 1160A may for example be disposed at an imaging site at a research facility, though this is an example only and other arrangements may be equally suitable.

Now with reference to FIG. 11B, an apparatus 1160B is shown therein. A laptop computer 1161B is shown; although not directly visible in perspective view, typically a laptop computer 1161B such as shown may include features such as a processor, a data store, a communicator (keyboard, touch pad, wifi card, etc.), an outputter (display screen), etc. Though also not visible, a processor in the laptop computer 1161B may support instantiated thereon data entities such as a gallery image establisher and a gallery model determiner.

Also in FIG. 11B, an imager 1164B is shown arranged so as to capture a full frontal two dimensional gallery image of a gallery subject 1134B. Two lights 1166B are shown arranged so as to provide frontal/overhead lighting from left and right of the gallery subject 1134B. It is noted that the gallery subject subject 1134B is shown in FIG. 11B for explanatory purposes (e.g. to show a subject as may be imaged with the relative to the imager 1164B and the lights 1166B); however, the gallery subject 1134B should not be interpreted as being an integral part of an apparatus according to the present invention.

As may be understood, the apparatus 1160B in FIG. 11BA thus may be adapted collectively to acquire two dimensional gallery images of gallery subjects (e.g. human faces), and process those images to generate three dimensional gallery models. Such an apparatus 1160B may for example be disposed at a Department of Motor Vehicles office, though this is an example only and other arrangements may be equally suitable.

Now with reference to FIG. 11C, an apparatus 1160C is shown therein. The example apparatus 1160C is shown in the form of a head mounted display, though this is an example only and other arrangements may be equally suitable.

The apparatus 1160C includes a frame 1198C resembling a pair of glasses. A processor 1162C is disposed on the frame 1198C. Although not visible in perspective view, the processor 1198C may support instantiated thereon data entities such as a query image establisher, a query model determiner, a learning model selector, a pre-transform determiner, a transform determiner, a model transformer, a transformed gallery image determiner, and an image comparer.

The apparatus 1160C shown in FIG. 11C also includes two imagers 1164C, as may be adapted to capture two dimensional query images, and two outputters 1172C. The imagers 1164C and outputters 1172C are engaged with the frame 1198C such that if the apparatus 1160C is worn, the imagers 1164C may be aimed so as to at least substantially be aligned with the wearer's line of sight and/or field of view; and such that the outputters 1172C may be disposed facing, proximate, and substantially aligned with the viewer's eyes. However such arrangements are examples only, and other arrangements may be equally suitable.

No query subject is shown in FIG. 11C, though as may be understood with the apparatus 1160C worn, the wearer may arrange the apparatus 1160C such that the imagers 1164C may capture query images of a query subject.

As may be understood, the apparatus 1160C in FIG. 11C thus may be adapted collectively to acquire two dimensional query images of some query subject (e.g. a human face), and process those images to generate three dimensional query models. As a head mounted display, such an apparatus 1160C may enable recognition of faces in the wearer's field of view, for example so as to support augmented reality by displaying names, reminders, and/or other information relating to persons, objects, and so forth. This is an example only, and the present invention is not limited only thereto.

With regard to FIG. 9, FIG. 10A through FIG. 10C, and FIG. 11A through FIG. 11C, it is noted that the example apparatuses shown therein are adapted to establish two dimensional images and determine three dimensional models therefrom. However, as previously noted, other variations, including but not limited to establishing three dimensional models without recourse to two dimensional images, also may be equally suitable. Accordingly, embodiments lacking such elements as the learning image establisher, gallery image establisher, and/or query image establisher may be equally suitable, along with other variations in keeping with the present invention.

In addition, although FIG. 10A through FIG. 10C and FIG. 11A through FIG. 11C show specific divisions and arrangements of elements, the present invention is not limited only to such divisions and/or arrangements. Other arrangements may be equally suitable. For example, in certain embodiments of the present invention the processor(s) may be distinct from the imager(s), with imager(s) simply capturing images (e.g. learning images, gallery images, query images), and other functions such as determining three dimensional models, determining pre-transforms and/or transforms, etc. being performed in a processor distinct and potentially separated from the imager(s) by substantial amounts of distance and/or time.

Furthermore, although the apparatuses in FIG. 9 and FIG. 10A through FIG. 10C are shown with image establishers that establish two dimensional images and model determiners that determine three dimensional models therefrom, this is an example only. As previously noted with regard to methods according to the present invention, for certain embodiments three dimensional models may be established without necessarily establishing and/or considering two dimensional images. In such instances, an apparatus according to the present invention may not include learning, gallery, and query image establishers, or may include only a query image determiner for determining a two dimensional query image (e.g. for comparison with transformed gallery images) from a three dimensional query model, etc. Similarly, embodiments that do not determine a pre-transform may not include a pre-transform determiner. These are examples only, and other arrangements may be equally suitable.

Although the present invention as shown and described with regard to FIG. 9, FIG. 10A through FIG. 10C, and FIG. 11A through FIG. 11C may be considered to have the respective data entities and/or executable instructions and/or data making up data entities already instantiated upon the respective processors, the present invention is not so limited. For at least certain embodiments, data entities may be read from a data store, received via a communicator, etc. and instantiated onto the processor(s). That is, a learning image establisher, a learning model determiner, a gallery image establisher, a gallery model determiner, a query image establisher, a query model determiner, a learning model selector, a pre-transform determiner, a transform determiner, a model transformer, a transformed gallery image determiner, an image comparer, etc. may be instantiated onto one or more processors.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A method, comprising:
    image-capturing a plurality of substantially two-dimensional learning images of a learning face, each of said learning images exhibiting a learning face aspect and a learning face illumination, said learning face aspects and said learning face illuminations varying among said learning images;
    communicating said learning images to a processor;
    determining in said processor a substantially three-dimensional learning model of said learning face from said learning images, said learning model exhibiting said learning face aspects and said learning face illuminations;
    image-capturing a substantially two-dimensional gallery image of each of a plurality of gallery faces, each of said gallery images exhibiting a gallery face aspect and a gallery face illumination, said gallery face aspects and said gallery face illuminations being at least substantially consistent among said gallery images;
    communicating said gallery images to said processor;
    determining in said processor a substantially three-dimensional gallery model of each of said gallery faces from said gallery images, said gallery models exhibiting respective gallery face aspects and gallery face illuminations;
    image-capturing a substantially two-dimensional query image of a query face, said query image exhibiting a query face aspect and a query face illumination, at least one of said query face aspect and said query face illumination being at least substantially inconsistent with said substantially consistent gallery face aspects and gallery face illuminations among said gallery images;
    communicating said query image to said processor;
    determining in said processor a substantially three-dimensional query model of said query face from said query image, said query model exhibiting said query face aspect and said query face illumination;
    determining in said processor a pre-transform for said query model in combination with said learning model so as to yield a transformed query model, wherein a transformed query face aspect of said transformed query model approaches correspondence with said substantially consistent gallery face aspects and a transformed query face illumination of said transformed query model approaches correspondence with said substantially consistent gallery face illuminations;
    determining a transform in said processor as at least substantially an inverse of said pre-transform, such that a transformed gallery face aspect of a transformed gallery model approaches correspondence with said query face aspect of said query model and a transformed gallery face illumination approaches correspondence with said query face illumination;
    applying said transform to at least one of said gallery models in said processor to yield at least one said transformed gallery model;
    for each of said at least one transformed gallery models, determining in said processor a substantially two-dimensional transformed gallery image exhibiting said transformed gallery face aspect and said transformed gallery face illumination;
    comparing said at least one transformed gallery image against said query image in said processor so as to determine whether said query face is said gallery face in said at least one transformed gallery image.

2. The method of claim 1, wherein:
    each of said learning images exhibits a learning face configuration, said learning face configurations varying among said learning images;
    each of said gallery images exhibits a gallery face configuration, said gallery face configurations being at least substantially consistent among said gallery images;
    said query image exhibits a query face configuration, at least one of said query face aspect, said query face illumination, and said query face configuration being at least substantially inconsistent with said substantially consistent gallery face aspects, gallery face illuminations, and gallery face configurations among said gallery images;
    determining said learning model so as to exhibit said learning face configurations;

determining said gallery models so as to exhibit respective gallery face configurations;

determining said query model so as to exhibit said query face configuration;

determining said pre-transform such that said transformed query face configuration approaches correspondence with said substantially consistent gallery face configurations;

determining said transform such that said transformed gallery face configurations approach correspondence with said query face configuration; and determining said substantially two-dimensional transformed gallery images exhibiting said transformed gallery face configurations.

3. The method of claim 2, wherein:

said face configurations comprise considerations regarding at least one of hair arrangement, jaw arrangement, muscle arrangement, lip arrangement, and eye arrangement.

4. The method of claim 1, wherein:

each of said learning images exhibits a learning face shape comprising a learning face configuration, said learning face shapes varying among said learning images;

each of said gallery images exhibits a gallery face shape comprising a gallery face configuration, said gallery face configurations being at least substantially consistent among said gallery images;

said query image exhibits a query face shape comprising a query face configuration, at least one of said query face aspect, said query face illumination, and said query face configuration being at least substantially inconsistent with said substantially consistent gallery face aspects, gallery face illuminations, and gallery face configurations among said gallery images;

determining said learning model so as to exhibit said learning face shapes;

determining said gallery models so as to exhibit respective gallery face shapes;

determining said query model so as to exhibit said query face shape;

determining said pre-transform such that said transformed query face configuration approaches correspondence with said substantially consistent gallery face configurations;

determining said transform such that said transformed gallery face configurations approach correspondence with said query face configuration; and determining said substantially two-dimensional transformed gallery images exhibiting said transformed gallery face configurations.

5. The method of claim 4, wherein:

said face shapes comprise considerations regarding at least one of hairstyle, injury, aging, glasses, hats, and jewelry.

6. The method of claim 1, wherein:

each of said learning images exhibits a learning face texture, said learning face textures varying among said learning images;

each of said gallery images exhibits a gallery face texture, said gallery face textures being at least substantially consistent among said gallery images;

said query image exhibits a query face texture, at least one of said query face aspect, said query face illumination, and said query face texture being at least substantially inconsistent with said substantially consistent gallery face aspects, gallery face illuminations, and gallery face textures among said gallery images;

determining said learning model so as to exhibit said learning face textures;

determining said gallery models so as to exhibit respective gallery face textures;

determining said query model so as to exhibit said query face texture;

determining said pre-transform such that said transformed query face texture approaches correspondence with said substantially consistent gallery face textures;

determining said transform such that said transformed gallery face textures approach correspondence with said query face texture; and determining said substantially two-dimensional transformed gallery images exhibiting said transformed gallery face textures.

7. The method of claim 6, wherein:

said face textures comprise considerations regarding at least one of roughness, smoothness, coloring, translucency, and reflectivity.

8. The method of claim 1, wherein:

said face illuminations comprise considerations regarding at least one of illumination direction, illumination focus, illumination diffusion, illumination source, illumination color, illumination spread, and illumination intensity.

9. The method of claim 1, wherein:

said query image exhibits at least one of obscuration of said query face, incomplete field of view coverage of said query face, out-of-focus of said query face, low resolution of said query face, motion blur of said query face, and insufficient lighting of said query face.

10. The method of claim 1, wherein:

said learning images, said gallery images, and said query image comprise at least one of a digital image, an analog image, a scanned image, color image, a monochrome image, a visible light image, a near infrared image, a thermal infrared image, a millimeter wave image, a transmissive x-ray image, a back scatter x-ray image, an ultraviolet image, a multispectral image, a hyperspectral image, and an ultrasound image.

11. The method of claim 1, wherein:

said transform comprises an illumination transfer.

12. The method of claim 1, wherein:

said transform comprises at least one of:
changing an orientation of said at least one gallery model to approach correspondence with an orientation of said query model;
changing an illumination of said at least one gallery model to approach correspondence with an illumination of said query model; and
changing a configuration of said at least one gallery model to approach correspondence with a configuration of said query model.

13. The method of claim 1, wherein:

said transform comprises changing at least one but not all factors of a shape of said at least one gallery model to approach correspondence with at least one but not all factors of a shape of said query model.

14. The method of claim 1, wherein:

said transform comprises changing at least one but not all factors of a texture of said at least one gallery model to approach correspondence with at least one but not all factors of a texture of said query model.

15. A method, comprising:

image-capturing a plurality of substantially two-dimensional learning images of a learning subject, each of said learning images exhibiting a learning subject aspect and a learning subject illumination, said learning subject aspects and said learning subject illuminations varying among said learning images;

communicating said learning images to a processor;

determining in said processor a substantially three-dimensional learning model of said learning subject from said learning images, said learning model exhibiting said learning subject aspects and said learning subject illuminations;

image-capturing a substantially two-dimensional gallery image of each of a plurality of gallery subjects, each of said gallery images exhibiting a gallery subject aspect and a gallery subject illumination, said gallery subject aspects and said gallery subject illuminations being at least substantially consistent among said gallery images;

communicating said gallery images to said processor;

determining in said processor a substantially three-dimensional gallery model of each of said gallery subjects from said gallery images, said gallery models exhibiting respective gallery subject aspects and gallery subject illuminations;

image-capturing a substantially two-dimensional query image of a query subject, said query image exhibiting a query subject aspect and a query subject illumination, at least one of said query subject aspect and said query subject illumination being at least substantially inconsistent with said substantially consistent gallery subject aspects and gallery subject illuminations among said gallery images;

communicating said query image to said processor;

determining in said processor a substantially three-dimensional query model of said query subject from said query image, said query model exhibiting said query subject aspect and said query subject illumination;

determining in said processor a pre-transform for said query model in combination with said learning model so as to yield a transformed query model, wherein a transformed query subject aspect of said transformed query model approaches correspondence with said substantially consistent gallery subject aspects and a transformed query subject illumination of said transformed query model approaches correspondence with said substantially consistent gallery subject illuminations;

determining in said processor a transform as at least substantially an inverse of said pre-transform, such that a transformed gallery subject aspect of a transformed gallery model approaches correspondence with said query subject aspect of said query model and a transformed gallery subject illumination approaches correspondence with said query subject illumination;

applying said transform to at least one of said gallery models in said processor to yield at least one said transformed gallery model;

for each of said at least one transformed gallery models, determining in said processor a substantially two-dimensional transformed gallery image exhibiting said transformed gallery subject aspect and said transformed gallery subject illumination;

comparing said at least one transformed gallery image against said query image in said processor so as to determine whether said query subject is said gallery subject in said at least one transformed gallery image.

16. A method, comprising:

establishing a plurality of substantially two-dimensional learning images of a learning subject, each of said learning images exhibiting a learning subject state, said learning subject state varying among said learning images;

communicating said learning images to a processor;

determining in said processor a substantially three-dimensional learning model of said learning subject from said learning images, said learning model exhibiting said learning subject states;

establishing a substantially two-dimensional gallery image of each of a plurality of gallery subjects, each of said gallery images exhibiting a gallery subject state, said gallery subject states being at least substantially consistent among said gallery images;

communicating said gallery images to said processor;

determining in said processor a substantially three-dimensional gallery model of each of said gallery subjects from said gallery images, said gallery models exhibiting respective gallery subject states;

establishing a substantially two-dimensional query image of a query subject, said query image exhibiting a query subject state, said query subject state being at least substantially inconsistent with said substantially consistent gallery subject states;

communicating said query image to said processor;

determining in said processor a substantially three-dimensional query model of said query subject from said query image, said query model exhibiting said query subject state;

determining in said processor a transform for at least one of said gallery models in combination with said learning model such that a transformed gallery subject state of a transformed gallery model approaches correspondence with said query subject state of said query model;

applying said transform to at least one of said gallery models in said processor to yield at least one said transformed gallery model;

for each of said at least one transformed gallery models, determining in said processor a substantially two-dimensional transformed gallery image exhibiting said transformed gallery subject state;

comparing said at least one transformed gallery image against said query image in said processor so as to determine whether said query subject is said gallery subject in said at least one transformed gallery image.

17. The method of claim 16, wherein:

said transform comprises at least one of:

changing an orientation of said at least one gallery model to approach correspondence with an orientation of said query model;

changing an illumination of said at least one gallery model to approach correspondence with an illumination of said query model; and changing a configuration of said at least one gallery model to approach correspondence with a configuration of said query model.

18. The method of claim 16, wherein:

said transform comprises changing at least one but not all factors of a shape of said at least one gallery model to approach correspondence with at least one but not all factors of a shape of said query model.

19. The method of claim 16, wherein:

said transform comprises changing at least one but not all factors of a texture of said at least one gallery model to approach correspondence with at least one but not all factors of a texture of said query model.

20. The method of claim 16, comprising:
establishing a plurality of substantially two-dimensional learning images of each of a plurality of learning subject, each of said learning images exhibiting a learning subject state, said learning subject state varying among said learning images for each of said learning subjects;
communicating said learning images to a processor;
determining in said processor a substantially three-dimensional learning model of each of said learning subjects from said learning images, said learning models exhibiting said learning subject states therefor;
selecting in said processor at least one of said learning models;
determining in said processor a transform for at least one of said gallery models in combination with said at least one selected learning model such that a transformed gallery subject state of a transformed gallery model approaches correspondence with said query subject state of said query model;
applying said transform to at least one of said gallery models to yield at least one said transformed gallery model;
for each of said at least one transformed gallery models, determining a substantially two-dimensional transformed gallery image exhibiting said transformed gallery subject state;
comparing said at least one transformed gallery image against said query image so as to determine whether said query subject is said gallery subject in said at least one transformed gallery image.

21. An apparatus, comprising:
a processor;
an imager in communication with said processor;
said imager being adapted to:
image-capture a plurality of substantially two-dimensional learning images of a learning face, each of said learning images exhibiting a learning face aspect and a learning face illumination, said learning face aspects and said learning face illuminations varying among said learning images;
communicate said learning images to said processor;
image-capture a substantially two-dimensional gallery image of each of a plurality of gallery faces, each of said gallery images exhibiting a gallery face aspect and a gallery face illumination, said gallery face aspects and said gallery face illuminations being at least substantially consistent among said gallery images;
communicate said gallery images to said processor;
image-capture a substantially two-dimensional query image of a query face, said query image exhibiting a query face aspect and a query face illumination, at least one of said query face aspect and said query face illumination being at least substantially inconsistent with said substantially consistent gallery face aspects and gallery face illuminations among said gallery images;
communicate said query image to said processor;
said processor being adapted to:
determine a substantially three-dimensional learning model of said learning face from said learning images, said learning model exhibiting said learning face aspects and said learning face illuminations;
determine a substantially three-dimensional gallery model of each of said gallery faces from said gallery images, said gallery models exhibiting respective gallery face aspects and gallery face illuminations;
determine a substantially three-dimensional query model of said query face from said query image, said query model exhibiting said query face aspect and said query face illumination;
determine a pre-transform for said query model in combination with said learning model so as to yield a transformed query model, wherein a transformed query face aspect of said transformed query model approaches correspondence with said substantially consistent gallery face aspects and a transformed query face illumination of said transformed query model approaches correspondence with said substantially consistent gallery face illuminations;
determine a transform as at least substantially an inverse of said pre-transform, such that a transformed gallery face aspect of a transformed gallery model approaches correspondence with said query face aspect of said query model and a transformed gallery face illumination approaches correspondence with said query face illumination;
apply said transform to at least one of said gallery models to yield at least one said transformed gallery model;
for each of said at least one transformed gallery models, determine a substantially two-dimensional transformed gallery image exhibiting said transformed gallery face aspect and said transformed gallery face illumination; and
compare said at least one transformed gallery image against said query image so as to determine whether said query face is said gallery face in said at least one transformed gallery image.

* * * * *